US008995339B2

(12) United States Patent
Buyukkoc et al.

(10) Patent No.: US 8,995,339 B2
(45) Date of Patent: Mar. 31, 2015

(54) NETWORK CONTROL OF APPLICATIONS USING APPLICATION STATES

(75) Inventors: Cagatay Buyukkoc, Holmdel, NJ (US); Gaviphat Lekutai, Kirkland, WA (US); Shyam P. Parekh, Orinda, CA (US); Arvind Ramachandran Raghavan, Austin, TX (US); Mostafa Tofighbakhsh, Cupertino, CA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 265 days.

(21) Appl. No.: 13/492,434

(22) Filed: Jun. 8, 2012

(65) Prior Publication Data
US 2013/0329632 A1 Dec. 12, 2013

(51) Int. Cl.
*H04W 4/00* (2009.01)
(52) U.S. Cl.
CPC ...................................... *H04W 4/00* (2013.01)
USPC ......................................................... 370/328
(58) Field of Classification Search
None
See application file for complete search history.

(56) References Cited

U.S. PATENT DOCUMENTS

| 8,559,967 | B2 * | 10/2013 | Froehlich et al. | 455/453 |
| 2012/0290663 | A1 * | 11/2012 | Hsieh et al. | 709/206 |
| 2013/0052965 | A1 * | 2/2013 | Meylan et al. | 455/73 |

OTHER PUBLICATIONS

"Characterizing Radio Resource Allocation for 3G Networks." Feng Qian, et al. Nov. 2010. 14 pages.
"Smarter Apps for Smarter Phones! A guide to improve apps connectivity, power consumption, user experience, security, and device battery life." GSM Association. Feb. 2012. 122 pages.
"ZTE Communications: Special Topic: Mobile Cloud Computing and Applications." Mar. 2011, vol. 9, No. 1. 70 pages.

\* cited by examiner

*Primary Examiner* — Kouroush Mohebbi
(74) *Attorney, Agent, or Firm* — Amin, Turocy & Watson, LLP

(57) ABSTRACT

Techniques for network control of application states of applications associated with a communication device are presented herein. An application agent, associated with an application used by the communication device, controls transitioning the application between application states based on network indicators received or network events detected from a communication network. The application states include active state or doze state. An application management component associated with the communication network at least partially controls transitioning the application between application states to facilitate controlling network traffic or reducing network congestion. The application agent or application management component can map application states to various factors, including radio states, congestion level, application performance indicators, network policies, or user policies, to facilitate determining which application state to apply to an application at a given time. The application agent can be in a centralized location, or at a same or different location as the application source.

20 Claims, 13 Drawing Sheets

NETWORK CONTROL OF APPLICATIONS USING APPLICATION STATES

TECHNICAL FIELD

This disclosure relates generally to network communications and, more specifically, to network control of applications using application states.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as, for example, Universal Mobile Telecommunications System (UMTS), Third Generation Partnership Project (3GPP) Long Term Evolution (LTE), High Speed Packet Access (HSPA). These specifications and/or standards use different modulation techniques, such as Code Division Multiple Access (CDMA), Time Division Multiple Access (TDMA), Frequency Division Multiple Access (FDMA), Multi-Carrier CDMA (MC-CDMA), Single-Carrier CDMA (SC-CDMA), Orthogonal Frequency Division Multiple Access (OFDMA), Single-Carrier Frequency Division Multiple Access (SC-FDMA), and so on.

Communication devices (e.g., wireless communication devices), such as mobile phones, electronic tablets, electronic gaming devices, and computers, are increasingly using applications to perform various functions and to communicate information between these communication devices and other communication devices (e.g., other mobile phones, electronic tablets, electronic gaming devices, computers, servers, etc.). An application can reside on a user's communication device, in a cloud, and/or on a server farm, for example.

In wireless communication networks, management of network traffic and network congestion can be desirable to facilitate efficient communication of traffic between communication devices. The increased use of applications by communication devices, increase in the amount of traffic being communicated in communication networks, differences in the classifications and/or characteristics of newly introduced applications, and/or other factors can make management of network traffic and network congestion increasingly more challenging and problematic for today's systems.

The above-described description is merely intended to provide a contextual overview of wireless communication networks, and is not intended to be exhaustive.

SUMMARY

The following presents a simplified summary of various aspects of the disclosed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed subject matter in a simplified form as a prelude to the more detailed description that is presented later.

Techniques for controlling an application(s) using application states are presented herein. The disclosed subject matter can include a method that can comprise applying, by a system including at least one processor, a mapping function associated with an application, wherein the mapping function at least in part maps a subset of application states of the application to a subset of wireless communication states associated with a communication device that uses the application in a communication network. The method also can include controlling, by the system, transitioning the application between application states based on the mapping function and a wireless communication state associated with the communication device.

The disclosed subject matter also can include a system comprising at least one memory that stores computer-executable instructions. The system also can include at least one processor, communicatively coupled to the at least one memory, that facilitates execution of the computer-executable instructions to at least: apply a mapping function associated with an application, wherein the mapping function at least in part maps a subset of application states of the application to a subset of radio communication states associated with a mobile communication device that uses the application in a communication network; and control transition of the application between application states based on the mapping function and a radio communication state associated with the mobile communication device.

The disclosed subject matter further can comprise a computer program product, which can include a computer-readable medium comprising computer executable instructions that, in response to execution by a computing system, cause the computing system to perform operations comprising: applying a mapping function associated with an application, wherein the mapping function at least in part maps a subset of application states of the application to a subset of wireless communication states associated with a communication device that uses the application in a communication network; and controlling switching of the application between application states based on the mapping function and a wireless communication state associated with the communication device.

Further, the disclosed subject matter can include a system comprising at least one memory that stores computer-executable instructions. The system also can include at least one processor, communicatively coupled to the at least one memory, that facilitates execution of the computer-executable instructions to at least: provide information that indicates an application is to be switched between a first application state and a second application state of a subset of application states associated with the application; and control transition of the application between the first application state and the second application state based on a mapping function associated with the application and a wireless communication state of a mobile communication device associated with a communication network, wherein the mapping function maps the subset of application states associated with the application to a subset of wireless communication states associated with the mobile communication device.

The following description and the annexed drawings set forth in detail certain illustrative aspects of the disclosed subject matter. These aspects are indicative, however, of but a few of the various ways in which the principles of the disclosed subject matter may be employed. The disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
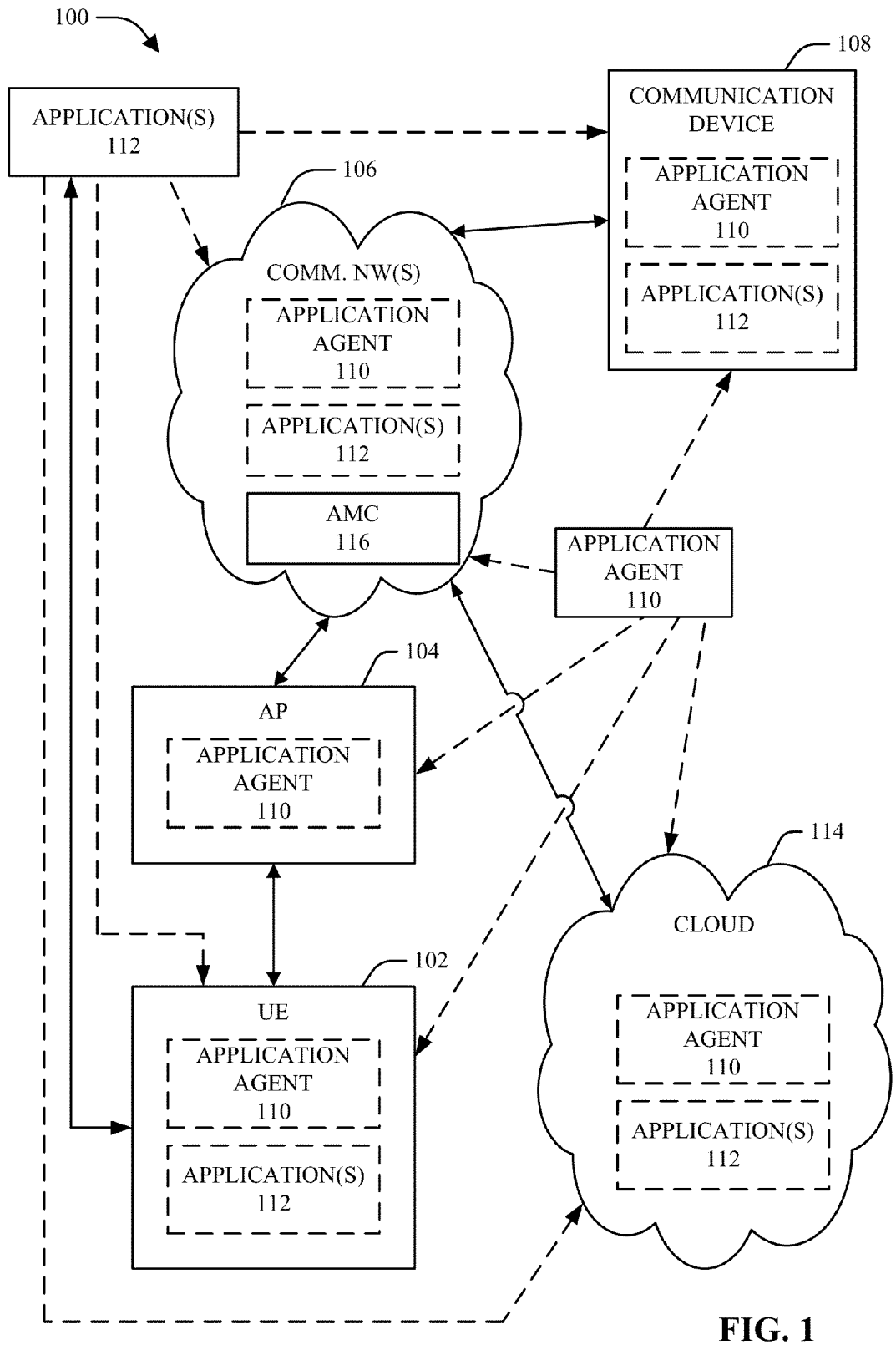
FIG. 1 illustrates a block diagram of an example system that can control transition of application states of one or more applications associated with user equipment (UE), in accordance with various aspects and embodiments described herein.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Communication devices (e.g., wireless communication devices), such as mobile phones, electronic tablets, electronic gaming devices, and computers, are increasingly using applications, including intelligent applications, to communicate information between these communication devices and other communication devices (e.g., other mobile phones, electronic tablets, electronic gaming devices, computers, servers, etc.). An application can reside on a user's communication device, in a cloud, and/or on a server farm, for example.

In wireless communication networks, management of network traffic and network congestion can be desirable to facilitate efficient communication of traffic between communication devices. The increased use of applications by communication devices, increase in the amount of traffic being communicated in communication networks, differences in the classifications and/or characteristics of newly introduced applications, continuing evolution of applications, and various other factors can make management of network traffic and network congestion increasingly more challenging and problematic for today's systems. Network behavior and application behavior can be dependent on a number of factors, such as, for example, the number of active users, network congestion level, user behavior with regard to communication devices, and/or the demographics of the user environments, including mobile communication device capabilities and the presence of other active applications on the mobile communication devices.

Currently, communication networks lack information relating to applications that can be desirable to better manage communication of network traffic. Also, applications often may not be aware of underlying network mechanisms or congestion states of the network, and the applications typically may not be able to coordinate with the network to relieve the network congestion. Traffic flow and network congestion control can be manageable through taking preventative and reactive measures, however, when network congestion indications are present, if nothing is done or inefficient measures are taken, there can be a significant (e.g., high) probability of massive chain reactions in the network, which can cause greater problems in the network. One potential way to manage application operations in relation to network conditions (e.g., network congestion levels) can be to employ constant traffic monitoring by end devices (e.g., mobile phones, computers, etc.). However, constant traffic monitoring by the end devices can unduly tax the end devices in terms of configuration, enabling, disabling, and reporting.

To that end, techniques that can facilitate network control of application states of applications associated with a communication device are presented herein. An application agent (e.g., proxy agent), which can be associated with an application used by the communication device, can identify a state of the application and can communicate that application state to an application management component associated with the communication network. The application states can include, for example, an active state or a doze (e.g., inactive, sleep, etc.) state, although, in some implementations, one or more other application states can be used in addition to or as an alternative to the active state and/or doze state. In some implementations, the application agent can communicate other application-related information, such as, for example, an elasticity level of the application (e.g., more elasticity can indicate a less time-critical application, less elasticity can indicate a more time-critical application (e.g., a real time application, such as Voice over Internet Protocol (VoIP), video streaming, or audio streaming), performance indicators (e.g., key performance indicators (KPIs)) associated with the application, and/or application category, etc., to the application management component.

The application agent or the application management component can generate a mapping function mapping application states of an application to various factors, such as radio states (e.g., wireless communication access states, such as, for example, a fetch (FTCH) state, a dedicated channel (DCH) state, an idle state, etc.), network congestion level, performance indicators (e.g., KPIs) associated with the application, network policies, user policies, etc., to facilitate determining which application state to apply to the application at a given time. The KPIs can include indicators relating to, for example, VoIP, video streaming, multimedia, electronic gaming, wireless communication factors or parameters, near field communication factors or parameters, security factors or parameters, bandwidth factors or parameters, location-related parameters, etc.

The application agent can monitor, detect, and/or receive information relating to application conditions (e.g., application state) of the application, information relating to network conditions (e.g., indicator relating to network congestion level) from the application management component, network-related information from a lower network layer(s) (e.g., network-related state or event information), and/or information that can be obtained via use of a software development kit(s) (SDK(s)) or application programming interface(s) (API(s)). At desired times (e.g., periodically, or in response to detected or received information (e.g., network condition-related indicator and/or application control information from the application management component, network-related state or event detected in a lower network layer, etc.)), the application agent can analyze the various factors, parameters, information (e.g., network state or event information from lower network layers), etc., and, using (e.g., applying) the mapping function, can identify an application state to apply to the application, based at least in part on the analysis results and the mapping function.

For example, the application agent can receive a network condition-related indicator (e.g., a network congestion indicator that can indicate the network is not experiencing a high level of network congestion, a network congestion indicator that can indicate the communication network has reached (e.g., breached) a certain threshold level of network congestion (e.g., a high (e.g., maximum) threshold network congestion level)), from the application management component. In response to receiving that network condition-related indicator, the application agent can analyze the network condition-related indicator and/or other information, and can apply the mapping function to that indicator and/or other information to determine which application state (e.g., active state, doze state) the application is to be set. In some implementations, the mapping function, and/or a set of defined rules that can constitute the mapping function, can be stored (e.g., in the form of a rules look-up table) in a data store associated with the application agent.

In response to determining the application state to be employed for the application, the application agent can generate control information (e.g., control command) that can indicate the application state to which the application is to be set (e.g., transitioned, or maintained). The application agent can communicate the control information to the application to facilitate controlling the application state of the application. The application can receive the control information and can set (e.g., transition, maintain) the application to the application state indicated by the control information.

In accordance with various implementations, the application agent can be located in a centralized location (e.g., in or associated with a core network), at a same location as the application source (e.g., on the communication device when the application is located on the communication device, in the cloud when the application is location in the cloud, etc.), and/or at a different location (e.g., on the communication device, wherein the application is located in the cloud; in the core network, wherein the application is located on the communication device or in the cloud; etc.). In some implementations, the application agent can be distributed across multiple components (e.g., communication device, core network, cloud, etc.) of the communication network.

An application that meets a defined certification criterion(s) can be certified as a qualified (e.g., intelligent) application by the communication network (e.g., the application management component of the communication network). In some implementations, applications (e.g., intelligent applications) that meet the defined certification criterion(s) can be automatically certified by the communication network. The defined certification criterion(s) can include, for example, that the application will transition between application states in response to control information from the application management component; the application will comply with applicable rules, SDKs, and/or APIs; the application (and/or associated application agent) will provide information regarding its current application state (e.g., upon request, periodically, in response to a triggering event, etc.); and/or the application (and/or associated application agent) will provide desired information to the application agent and/or application management component to enable the application agent and/or the application management component to generate a mapping function comprising a mapping between the application states and the various factors. An SDK or API can be used to facilitate registering or certifying an application with the application management component, exchanging of information (e.g., application states, KPIs, etc.) between the network and the application agent, etc., to facilitate enabling the application agent and application management component to manage operation of the application.

Referring now to the drawings, FIG. 1 illustrates a block diagram of an example system 100 that can control transition of application states of one or more applications associated with user equipment (UE), in accordance with various aspects and embodiments described herein. The system 100 can comprise a UE 102 (e.g., mobile and/or wireless communication device, such as a mobile phone (e.g., 3GPP Universal Mobile Telecommunications System (UMTS) phone), personal digital assistant (PDA), computer, set-top box, electronic notebook, electronic pad or tablet, electronic gaming device, etc.) that can operate and communicate in a communication network environment. In an aspect, the UE 102 can be communicatively connected via a wireless communication connection(s) via an access point (AP) 104 to a communication network(s) 106 (COMM. NW(s) 106).

In an aspect, as the UE 102 is moved through a wireless communication network environment, at various times, the UE 102 can be connected (e.g., wirelessly connected) to one of a plurality of APs (e.g., macro or cellular AP, femto AP, pico AP, Wi-Fi AP, Wi-Max AP, hotspot (e.g., Hotspot 1.x, Hotspot 2.x, where x is an integer number; UE functioning as a mobile hotspot; etc.), etc.), such as an AP 104, that can operate in the wireless communication network environment. An AP (e.g., 104) can serve a specified coverage area to facilitate communication by the UE 102 or other UEs in the wireless communication network environment. The AP 104 can serve a respective coverage cell (e.g., macrocell, femtocell, picocell, etc.) that can cover a respective specified area, and the AP 104 can service mobile wireless devices, such as UE 102, located in the respective area covered by the respective cell, where such coverage can be achieved via a wireless link (e.g., uplink (UL), downlink (DL)). When an attachment attempt is successful, the UE 102 can be served by the AP 104 and incoming voice and data traffic can be paged and routed to the UE 102 through the AP 104, and outgoing voice and data traffic from the UE 102 can be paged and routed through the AP 104 to other communication devices (e.g., another UE) in the communication network environment. In an aspect, the UE 102 can be connected and can communicate wirelessly using virtually any desired wireless technology, including, for example, cellular, Wi-Fi, Wi-Max, wireless local area networks (WLAN), etc.

In another aspect, the communication network 106 can facilitate wireless connection with the UE 102 connected to the AP 104 and facilitate communication by or between a UE 102 and another UE(s) or other type of communication device(s) (e.g., computer, server or server farm that can include an application server or content server that can be provide video content, audio content, and/or other content comprising other types of information, etc.), such as communication device 108 associated with the communication network 106 in the communication network environment. The communication network 106 can include one or more wireline networks and one or more wireless networks, wherein the one or more wireless networks can be based on one or more various types of communication technology or protocols, such as, for example, Third Generation (3G), Fourth Generation (4G), or x Generation (xG) network, where x can be virtually any desired integer or real value; Wi-Fi; etc. The communication network 106 (e.g., a core network, or a network comprising a core network and/or an IP-based network) can facilitate routing voice and data communications between a communication device(s) (e.g., UE 102) and other communication devices (e.g., another UE, communication device 108) associated with the communication network 106 in the communication network environment. The communication network 106 also can allocate resources to the UE 102 or other UEs in the communication network 106, convert or enforce protocols, establish and enforce Quality of Service (QoS) for the UEs, provide applications or services in the communication network 106, translate signals, and/or perform other desired functions to facilitate system interoperability and communication in the communication network 106 (e.g., wireless portion of the communication network 106 or wireline portion of the communication network 106). The communication network 106 further can include desired components, such as routers, nodes, switches, interfaces, controllers, etc., that can facilitate communication of data between communication devices in the communication network environment.

The system 100 can include one or more application agents 110 (e.g., proxy agent(s)), which can be associated with one or more applications 112 used by or associated with (e.g., communicatively connected to) the UE 102. An application agent 110 can facilitate controlling the operating state (e.g., active state, doze state, other operating state) of an associated application 112. In accordance with various implementations, an application agent(s) 110 can be located on the UE 102, the base station 104, the communication network 106, the communication device 108, a cloud 114 (e.g., cloud computing system) associated with (e.g., communicatively connected to) the communication network 106, and/or in another component associated with the communication network 106. It is to be appreciated and understood that, in FIG. 1, the dotted lines from the application agent 110 to various components (e.g., UE 102, base station 104, communication network 106, cloud 114, etc.), and the application agents 110 represented by boxes formed of a dotted line, are intended to illustrate various example locations of the application agent(s) 110 in relation to various components of the system 100.

In accordance with various implementations, an application agent 110 can be located in a centralized location (e.g., in or associated with a core network), at a same location as the source of the application 112 (e.g., on the UE 102 when the application 112 is located on the UE 102, in the cloud 114 when the application 112 is location in the cloud 114, etc.), and/or at a different location (e.g., on the UE 102, wherein the application 112 is located in the cloud 114; in the core network, wherein the application 112 is located on the UE 102 or in the cloud 114; etc.), depending in part on the type of application, type of UE, and/or other factors, in accordance with one or more defined application-control criterion. In some implementations, an application agent 110 can be distributed across multiple components (e.g., UE 102, core network, cloud 114, etc.) associated with the communication network 106.

In accordance with various implementations, an application(s) 112 can be located on the UE 102, communication network 106, communication device 108, cloud 114, and/or in another component associated with the communication network 106. It is to be appreciated and understood that, in FIG. 1, the dotted lines from the application 112 to various components (e.g., UE 102, communication network 106, cloud 114, etc.), and the application(s) 112 represented by a box formed of a dotted line, are intended to illustrate various example locations of the application(s) 112 within various components of the system 100. It is also to be appreciated and understood that the double-arrowed solid line between the UE 102 and the application(s) 112 (e.g., one or more applications 112) is intended to represent that the UE 102 can be connected (e.g., directly) with one or more applications 112 using, for example, one or more various types of wireless communication technology, such as near field communication (NFC) technology, Bluetooth technology, ZigBee technology, etc. In some implementations, the UE 102 can function as a mobile hotspot (e.g., AP) to which one or more applications 112 can be wirelessly connected to facilitate communication of traffic (e.g., voice or data traffic) between an application(s) 112 and the communication network 106 via the UE 102. It is to be further appreciated and understood that one or more communication devices (e.g., 108) can be located within the cloud 114, wherein, for example, the cloud 114 can include a server farm comprising one or more servers (e.g., application servers) that can be utilized to perform respective application functions (e.g., VoIP, video streaming, messaging, multimedia, electronic gaming, news-related functions, social media functions, finance-related functions, etc.) based at least in part on the type of application.

In some implementations, the communication network 106 can include or be associated with (e.g., communicatively connected to) an application management component 116 (AMC 116) that can at least partially control application states and/or operations of applications 112 associated with UEs, such as UE 102, associated with the communication network 106. The application management component 116 also can be associated with (e.g., communicatively connected to) the one or more application agents 110 to facilitate controlling the application states of one or more applications 112 associated with the one or more application agents 110.

An application agent 110 can identify a state of an application(s) 112 and can communicate that application state to the application management component 116. The application states can include, for example, an active state or a doze (e.g., inactive) state. The active state can be a state wherein the application 112 can be actively transmitting information to or receiving information from another communication device (e.g., via the communication network 106). The doze state can be a state wherein the application 112 can be asleep, inactive, and/or otherwise not in active communication with another communication device (e.g., via the communication network 106). When an application 112 is in (e.g., is commanded to be in) an active state, the application 112 can function in a normal manner for that application 112. When an application 112 is in (e.g., is commanded to be in) a doze state, the application 112 can function as recommended or commanded by the application agent 110 and/or application management component 116, in accordance with the defined application-control criterion(s), including criterion(s) relating to network access policies. In some implementations, one or more other application states (e.g., an intermediate state(s) between the active state and doze state) can be used in addition to or as an alternative to the active state and/or doze state. The application agent 110 also can communicate other application-related information, such as, for example, an elasticity level of the application 112 (e.g., more elasticity can indicate a less time-critical application, less elasticity can indicate a more time-critical application (e.g., a real-time application, such as VoIP, video streaming, or audio streaming), performance indicators (e.g., key performance indicators (KPIs)) associated with the application 112, and/or an application category associated with the application 112, etc., to the application management component 116 to facilitate managing application states of the application 112. In some implementations, the disclosed subject matter, using an application agent(s) 110 and/or application management component 116, can enable elastic applications, which have more elasticity, to have a greater degree of flexibility in operation as compared to non-elastic or less elastic applications.

The application agent 110 and/or the application management component 116 can generate a mapping function mapping application states of an application 112 to various factors, such as radio states (e.g., wireless communication access states, such as, for example, a fetch (FTCH) state, a dedicated channel (DCH) state, an idle state, etc.), network congestion level of the communication network 106, performance indicators (e.g., KPIs) associated with the application 112, network policies of the communication network 106, user policies of users associated with the UEs 102, etc., to facilitate determining which application state to apply to the application 112 at a given time. The KPIs can include indicators relating to, for example, VoIP, video streaming, multimedia, electronic gaming, wireless communication factors or parameters, near field communication (NFC) factors or parameters, security factors or parameters, bandwidth factors or parameters, location-related parameters, etc. For example, a KPI of an application 112 can state that the application 112 desires (e.g., requires) at least a certain communication speed (e.g., 200 kilobytes per second (kbps)) when communicating with (e.g., downloading data via) the communication network 106; a KPI can specify that the application 112 has respective (e.g., different) characteristics and/or capabilities, based on the type of communication network (e.g., 3G network, Wi-Fi network, etc.), and these respective characteristics and/or capabilities are to be taken into account by the communication network 106 and/or the application management component 116 when servicing the application 112; or another KPI can be location related and can specify that certain characteristics and/or capabilities of the application 112 pertain to a particular zone (e.g., geographical zone) and these certain characteristics and/or capabilities are to be taken into account by the communication network 106 and/or the application management component 116 when servicing the application 112 while in or associated with that particular zone.

The application agent 110 associated with an application 112 can monitor, detect, and/or receive information relating to application conditions (e.g., application state) of the application 112, information relating to network conditions (e.g., indicator relating to network congestion level) from the application management component 116, network-related information from a lower network layer(s) (e.g., network-related state or event information), and/or information that can be obtained via use of an SDK(s) or API(s). At desired times (e.g., periodically, or in response to detected or received information (e.g., network condition-related indicator and/or application control information from the application management component 116, network-related state or event detected in a lower network layer, etc.)), the application agent 110 can analyze the various factors, parameters, information (e.g., network state or event information from lower network layers), etc., and, using (e.g., applying) the mapping function associated with the application 112, the application agent 110 can identify an application state to apply to the application 112, based at least in part on the analysis results and the mapping function.

Figure 4:
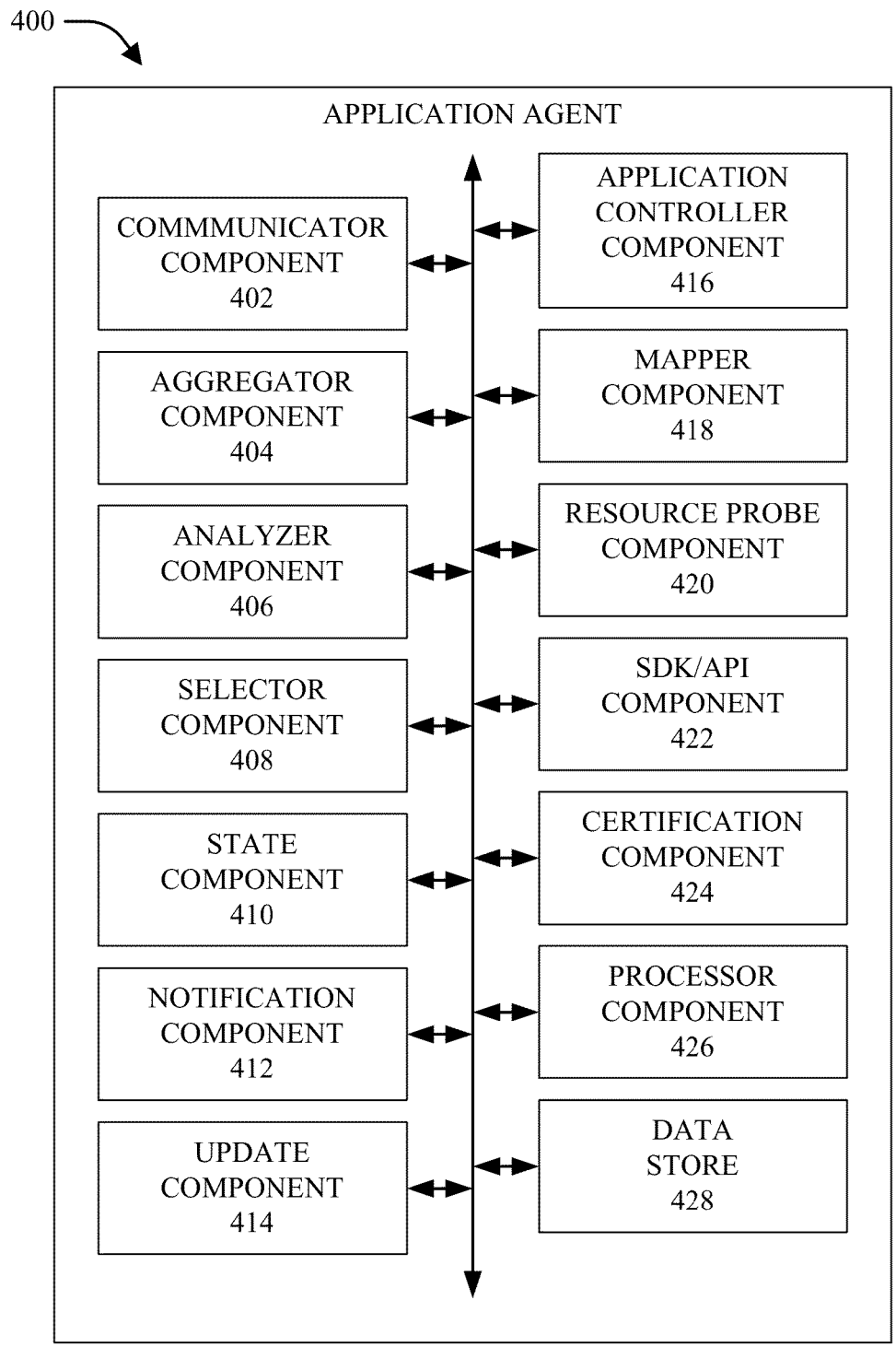
FIG. 4 depicts a block diagram of an example application agent in accordance with various aspects and embodiments of the disclosed subject matter.

For example, the application agent 110 can receive a network condition-related indicator (e.g., a network congestion indicator that can indicate the communication network 106 (e.g., wireless portion of the communication network 106) is not experiencing a high level of network congestion, a network congestion indicator that can indicate the communication network 106 has reached (e.g., breached) a certain threshold level of network congestion (e.g., a defined high threshold network congestion level)), from the application management component 116. In response to receiving that network condition-related indicator, the application agent 110 can analyze the network condition-related indicator and/or other information (e.g., various factors, parameters, etc.), and can apply the mapping function to that indicator and/or other information to determine which application state (e.g., active state, doze state) the application 112 is to be set. In some implementations, the mapping function, and/or a set of defined rules that can constitute the mapping function, can be stored (e.g., in the form of a rules look-up table) in a data store (not shown in FIG. 1; e.g., as shown in FIG. 4) associated with the application agent 110.

For instance, if the network congestion indicator indicates that the communication network 106 is not experiencing a high level of network congestion (e.g., network congestion is below a defined high threshold network congestion level), and the mapping function specifies that the application 112 can be set to the active state or can remain in the doze state in response to such network congestion indicator, the application agent 110 can facilitate setting (e.g., transitioning) the application 112 to the active state or the doze state (e.g., unless there are other factors contained in the mapping of the mapping function that would dictate differently with regard to the application state). If the network congestion indicator indicates that the communication network 106 is experiencing a high level of network congestion (e.g., network congestion that is at or above a defined high threshold network congestion level), and the mapping function specifies that the application 112 is to be set to the doze state in response to such network congestion indicator, the application agent 110 can facilitate setting (e.g., transitioning) the application 112 to the doze state (e.g., unless there are other factors contained in the mapping of the mapping function that would dictate differently with regard to the application state, wherein the mapping function specifies that the application 112 be in the active state even if the network congestion indicator indicates a high level of network congestion due to other factors relating to the application 112). While in the doze state, the application 112 can operate in accordance with a desired (e.g., good) behavior in relation to the communication network 106 and/or can operate using alternative measures, such as, for example, using a cache, another access selection, queue management, local storage, or other control means available to the application 112 to facilitate performing at least some operations of the application 112.

In response to determining the application state to be employed for the application 112, the application agent 110 can generate control information (e.g., control command) that can indicate the application state to which the application 112 is to be set (e.g., transitioned, or maintained). The application agent 110 can communicate the control information to the application 112 to facilitate controlling the application state of the application 112. The application 112 can receive the control information and can set (e.g., transition, maintain) the application 112 to the application state indicated by the control information.

In some implementations, the application agent 110 and/or application management component 116 can synchronize communications and/or application states of multiple applications 112 to facilitate efficient communication of traffic in the communication network 106, reducing signaling relating to application state transitions and/or use of communication channels, and/or otherwise reduce resources used by the UE 102 and/or the communication network 106, as well as reduce power consumption by the UE 102 and/or the communication network 106. For instance, a first application (e.g., 112) can be transmitting content via a communication channel, and a second application (e.g., 112) can be ready to transmit or preparing to transmit its content via that communication channel. The application management component 116 and the application agent(s) 110 associated with the first application and second application can control the respective application states of the first application and second application, and the state of the communication channel to synchronize the respective application states of the first application and second application so that the application state of the first application remains in the active state and/or the application state of the second application transitions to the active state so that the content of the second application can be communicated via the communication channel after the content of the first application is communicated via the communication channel without the communication channel transitioning to the idle state and then back to an active state between the communication of the content of the first application and the communication of the content of the second application. This can reduce the signaling relating to transitioning of the communication channel between the idle state and active state and/or can reduce the signaling between the second application and/or the associated application agent 110 and/or the first application and/or the associated application agent 110) and the communication network 106 (and/or the application management component 116) in relation to communicating content via the communication channel and/or establishing communication with the communication channel.

In some implementations, the UE 102 can function as a mobile hotspot (e.g., AP) to facilitate communication of traffic (e.g., voice or data traffic) between an application(s) 112 and the communication network 106 via the UE 102. One or more applications 112 can be wirelessly connected to the UE 102, which can act as a mobile hotspot in relation to the one or more applications 112. An application agent 110, associated with the one or more applications 112 connected to the UE 102, and/or the application management component 116 can control switching of the respective applications 112 between respective applications states, based at least in part on respective mapping functions of the respective applications 112, the defined application-control criterion(s) (and/or corresponding defined application-control rules), user policies in a user profile(s) associated with the UE 102 and/or the application(s) 112, etc., as more fully disclosed herein.

The mapping function associated with an application 112 can be based in part on (e.g., at least initially) default control settings (e.g., device-level default control settings), wherein the application 112 can use device-level capabilities to enhance (e.g., improve, optimize, maximize) the experience of the user. In certain implementations, a user of an application 112 and/or the UE 102 can select or implement one or more user policies that can be included or incorporated in to the mapping function associated with the application 112 to facilitate controlling the application state of the application 112 based at least in part on the one or more user policies (e.g., as desired by the user). For instance, the application agent 110 associated with the application 112 can offer a menu of application-related policies to the user via the UE 102 (or other communication device), and the user can select one or more of those application-related policies from the menu, and those policies can be stored as user policies for the application 112 in a user profile associated with the user, wherein the user profile can be stored in a data store(s) associated with the application agent 110 and/or the application management component 116. Some example application-related (user selected) policies can include or relate to controlling when the application 112 is in the active state or doze state, controlling the minimum communication rate (e.g., kbps) for communications associated with the application 112, controlling location-related parameters relating to the application 112, controlling security parameters relating to the application 112, etc.

In some implementations, an application 112 that meets a defined certification criterion(s) can be certified by the communication network 106 (e.g., the application management component 116 of the communication network 106). An application 112 (e.g., qualified or intelligent application) that meets the defined certification criterion(s) can be automatically certified as a qualified (e.g., intelligent) application by the communication network 106. The defined certification criterion(s) can relate to or be part of defined application-control criterion(s). The defined certification criterion(s) can include, for example, that the application 112 will transition between application states in response to control information from the application management component 116 and/or application agent 110; the application 112 will comply with applicable rules, SDKs, and/or APIs; the application 112 (and/or associated application agent 110) will provide information regarding the application's current application state (e.g., upon request, periodically, in response to a triggering event, etc.); and/or the application 112 (and/or associated application agent 110) will provide desired information to the application agent 110 and/or application management component 116 to enable the application agent 110 and/or the application management component 116 to generate a mapping function comprising a mapping between the application states and the various factors. An SDK or API can be used to facilitate registering or certifying an application 112 with the application management component 116, exchanging of information (e.g., application states, KPIs, etc.) between the communication network 106 and the application agent 110, etc., to facilitate enabling the application agent 110 and application management component 116 to manage operation and/or application states of the application 112.

Figure 2:
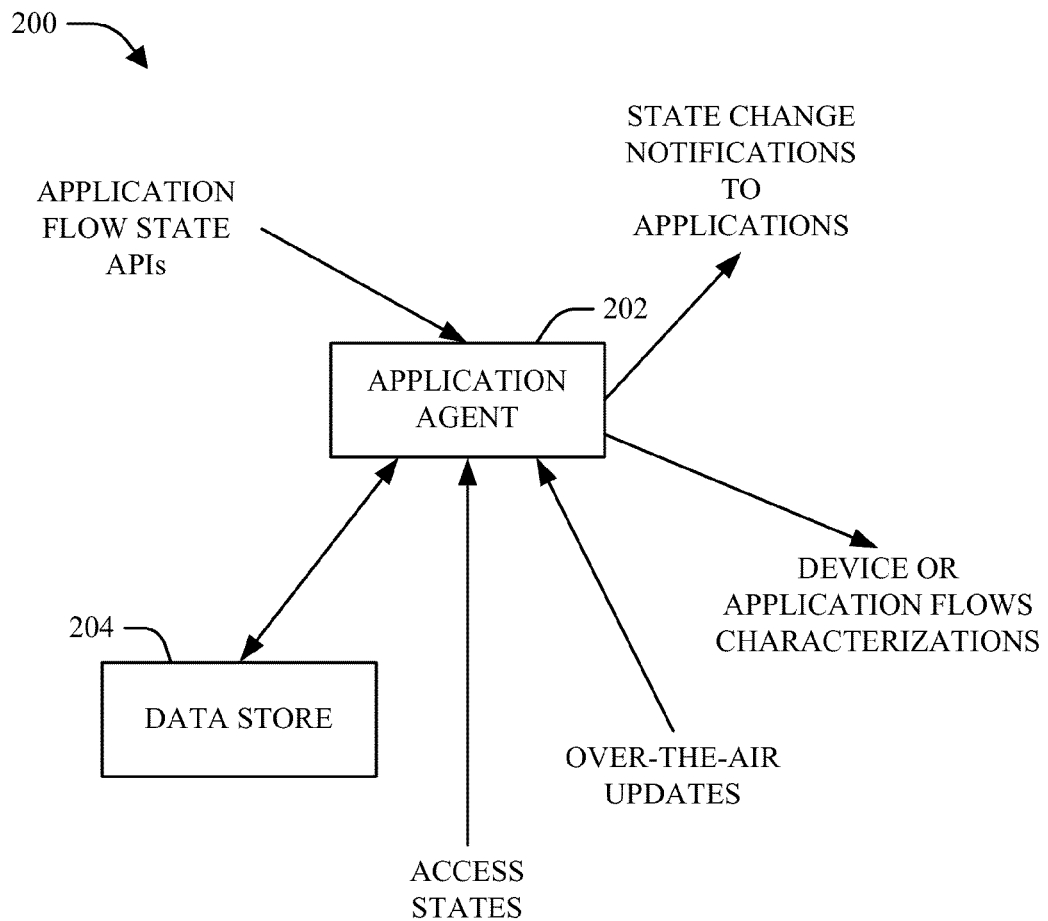
FIG. 2 depicts a block diagram of an example system that can use an application agent to facilitate controlling application states of an application(s) associated with UE in accordance with various aspects and embodiments.

FIG. 2 depicts a block diagram of an example system 200 that can use an application agent to facilitate controlling application states of an application(s) associated with UE in accordance with various aspects and embodiments. The system 200 can include an application agent 202 that can be associated with one or more applications (not shown in FIG. 2; e.g., as shown in FIG. 1) and can control application states of the one or more applications, in accordance with defined application-control criteria, as more fully disclosed herein.

The application agent 202 can be associated with (e.g., communicatively connected to) a data store 204 that can store data relating to operations of the application agent 202, applications associated with the application agent 202, mapping functions associated with the applications, etc. The data store 204 can store one or more rules, wherein respective rules can be associated with respective mapping functions of respective applications to facilitate controlling application states and/or other operations of the applications in accordance with the respective rules.

The application agent 202 can receive information to facilitate determining which state an application is to be in at a given time and controlling the application state of that application. For instance, the application agent 202 can receive information, including access states associated with a communication network(s) (not shown in FIG. 2; e.g., as shown in FIG. 1), application flow state APIs, and/or other information from other sources. The application agent 202 can analyze the access states, application flow state APIs, and/or other information to facilitate generating a mapping function comprising a mapping of application states to access states (e.g., radio states associated with applications and/or associated communication devices), congestions notifications, and/or other network congestion policies, etc. The application agent 202 can use the mapping function to facilitate determining which state an application is to be in at a given time and controlling the application state of that application. In some implementations, the application agent 202 also can map hypertext markup language (HTML)-related protocols or parameters (e.g., protocols or parameters relating to HTML5, HTML 4.01, eXtensible HTML (XHTML) 1.1, etc.) to bearer functions and application states in relation to an application.

The application agent 202 can apply a mapping function associated with the application, wherein the mapping function can be stored in the data store 204 and can include one or more rules, and can control the application state and/or other operations of the application based at least in part on the mapping function and the analysis results relating to the received information. The application agent 202 can generate control information, including a state change notification, and can communicate such control information to an application to facilitate changing an application state of the application in according with the mapping function of the application. The application can receive such control information and can set (e.g., adjust, transition, etc.) its application state in response to the received control information.

The application agent 202 also can receive over-the-air rules updates, for example, from the communication network, and can store the updated rules in the data store 204. For example, the application agent 202 can update a mapping function of an application based at least in part on the updated rules, and can store the updated mapping function in the data store 204, wherein the updated mapping function can be used by the application agent 202 to facilitate determining which state the application is to be in at a given time and controlling the application state of that application.

The application agent 202 also can communicate device or application flows characterizations to, for example, the communication network (e.g., an application management component associated with the communication network) to facilitate enabling the communication network to have information regarding the application, including characteristics and/or capabilities of the application and/or information relating to information flow associated with the application and/or associated UE. The communication network (e.g., associated application management component) can use the device or application flow characterizations to facilitate making determinations regarding an application state an application is to be in at a given time, synchronizing communications and/or application states of applications, determining and/or communicating network congestion notifications, etc.

Figure 3:
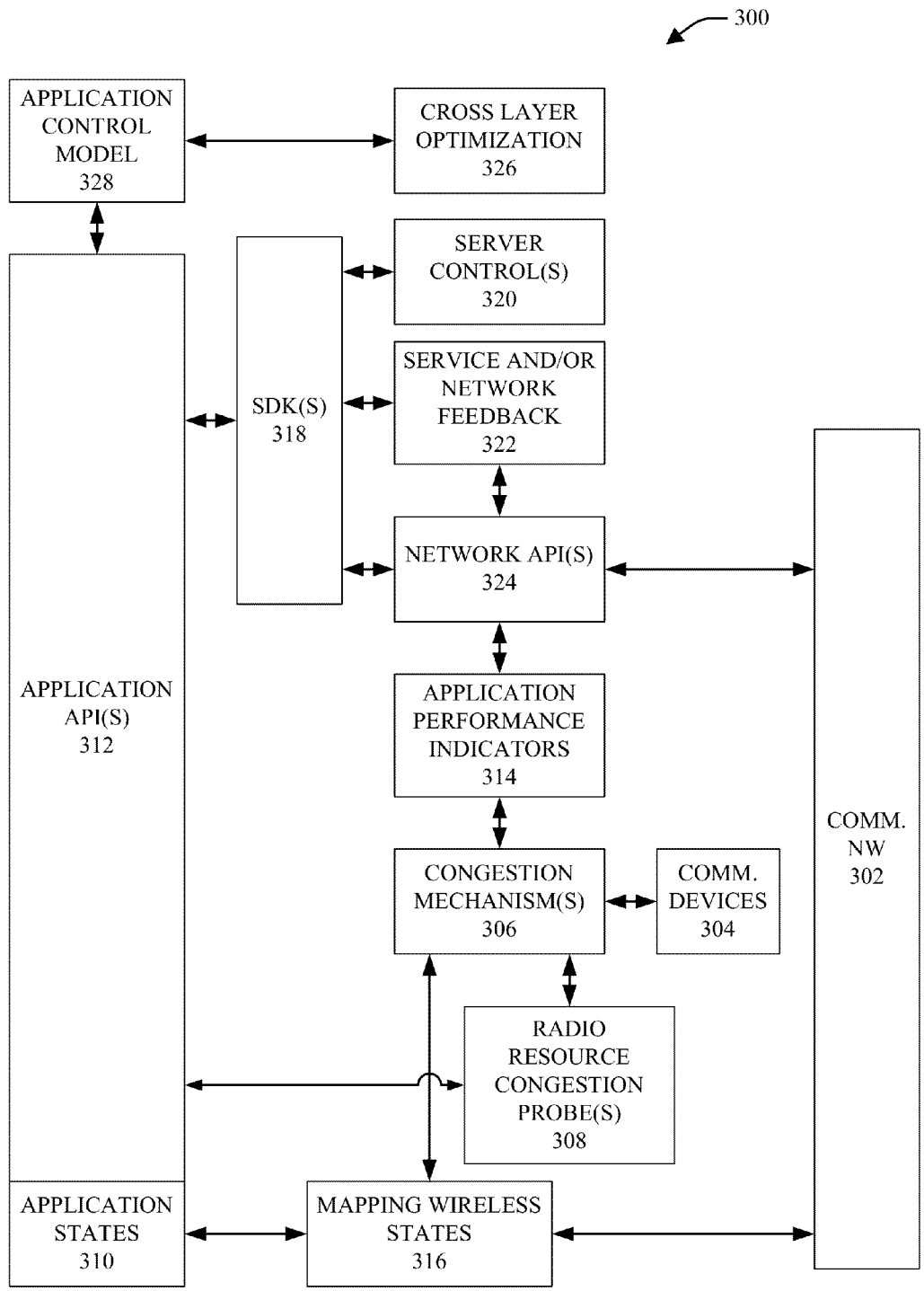
FIG. 3 illustrates a diagram of an example application control framework that can be employed to control application states of applications associated with a communication network in accordance with various aspects and embodiments described herein.

Referring to FIG. 3 (along with FIGS. 1 and 2), FIG. 3 illustrates a diagram of an example application control framework 300 that can be employed to control application states of applications associated with a communication network in accordance with various aspects and embodiments described herein. The application control framework 300 can include a communication network 302 (comm. NW 302) that can enable communication of information (e.g., voice or data information) between communication devices 304 (comm. devices 304) (e.g., UEs, computers, servers, electronic pads or tablets, etc.) that can be distributed across a communication network environment as part of the application control framework 300.

The application control framework 300 also can include one or more congestion mechanisms 306 that can be used to monitor, detect, and/or control network congestion associated with the communication network 302. The congestion mechanisms 306 can be associated with or included in, for example, an application agent (e.g., 110), a communication device (e.g., UE 102, communication device 108, cloud 114), or application management component (e.g., 116). The communication devices 304 and the congestion mechanisms 306 respectively can include and use an interface that can enable the communication devices 304 to access, manage, and/or use the congestion mechanisms 306, and/or the interface can be used to communicate information between a communication device 304 and a congestion mechanism 306. In some implementations, the interface(s) associated with the communication devices 304 and congestion mechanisms 306 can be operating system (OS) specific.

The application control framework 300 can include radio resource congestion probes 308 that can be used to monitor, detect, and/or measure communication conditions (e.g., network congestion, communication channel conditions, signal strength, etc.) associated with the communication network 302. The radio resource congestion probes 308 can be associated with, for example, an application agent or application management component. A radio resource congestion probe 308 can include an interface that can enable the radio resource congestion probe 308 to interface and communicate with the congestion mechanisms 306 and the communication network 302, wherein the congestion mechanisms 306 and the communication network 302 each can have an interface that can enable the congestion mechanisms 306 and the communication network 302 to interface and communicate with radio resource congestion probes 308.

The radio resource congestion probes 308 also can interface with or otherwise be associated with application states 310 (e.g., active state, doze state, etc.) associated with an application(s) and one or more application APIs 312 that can be part of the application control framework 300. The congestion mechanisms 306 also can be interfaced with the one or more application APIs 312 associated with the applications to facilitate enabling an application agent to obtain information associated with the communication network 302 and operate pursuant to communication network standards (e.g., network policies applicable to an application certified as a qualified application). The application APIs 312 can define the expected behavior of application states of applications. In some implementations, at least some of the application APIs 312 can be defined and standardized among application developers to facilitate efficient use of application APIs 312 in the communication network environment. The application agent and/or associated application can use the application APIs 312, as disclosed herein.

The application control framework 300 can employ application performance indicators 314 (e.g., KPIs or key performance requirements) respectively associated with applications, and the congestion mechanisms 306 can be associated with or interface with the application performance indicators 314. The application performance indicators 314 can provide information regarding the level of elasticity of an application, an application category or type for an application, and/or other information relating to the performance or functions of the application, the level or type of service the application desires from the communication network 302, etc. The application agent and/or associated application can provide the application performance indicators 314 to the communication network 302 (and/or associated application management component) to facilitate enabling the communication network to identify the application performance indicators 314 of the application and/or to facilitate registering or certifying the application (e.g., enabling the application to self-certify) with the communication network 302.

The application control framework 300 can further include a mapping of wireless states 316 that can be a mapping function that contains a mapping of the wireless (e.g., radio) states to the application states 310 of the applications and/or other factors, such as all or a portion of the application performance indicators 314, network indicators, network policies, network conditions, application conditions, application behavior, etc. The application agent and/or communication network 302 can generate, access, and/or utilize the mapping function to facilitate managing setting an application to a desired application state, as disclosed herein.

The application control framework 300 also can include one or more SDKs 318, which can be associated with or interfaced with the one or more application APIs 312, and can be used by an application agent and/or associated application to facilitate enabling the application and/or associated application to control transitioning of the application between application states, and/or having the application agent and/or application operate in accordance with communication network standards applicable to qualified applications.

In some implementations, the application control framework 300 can comprise one or more server controls 320 associated with one or more servers associated with the communication network 302. The one or more server controls 320 can be interfaced with the one or more SDKs 318 to facilitate exchanging information to facilitate operation of the one or more SDKs 318. The interface associated with the one or more server controls 320 can be OS specific in certain implementations.

The application control framework 300 also can provide service and/or network feedback 322 to the one or more SDKs 318 via an interface. The service and/or network feedback 322 can be associated with, generated by, and/or received from one or more network APIs 324 used by, for example, an application agent or application management component to provide information relating to the application to the communication network 302. In some implementations, the interfaces associated with the service and/or network feedback 322 and/or the one or more SDKs 318 can be OS specific.

The one or more network APIs 324 can interface with the communication network 302 to facilitate exchanging information with the communication network 302 to facilitate controlling the application state of an application. The one or more SDKs 318 also can be interfaced with the one or more network APIs 324 to exchange information associated with an application. The one or more network APIs 324 also can facilitate identifying and/or providing information relating to the application performance indicators 314 to the communication network 302. In accordance with various implementations, certain of the interfaces associated with the network APIs 324 can be OS specific.

In some implementations, the application control framework 300 can utilize cross layer optimization 326 to facilitate communicating (e.g., dynamically) feedback relating to the communication network 302 between different network layers. The communication network 302, application management component (e.g., 116), application agent (e.g., 110), and/or application (e.g., 112) can include components, mechanisms, and/or interfaces that can facilitate implementing the cross layer optimization 326.

The application control framework 300 can include an application control model 328 that can be employed by an application agent, application, and/or application management component to facilitate controlling operation of the application to transition the application between application states. The application control model 328 can comprise components, mechanisms, and/or interfaces that can obtain and/or process (e.g., analyze) the information associated with the cross layer optimization 326 to facilitate controlling operation of the application to transition the application between application states. In certain implementations, the application control model 328 can be associated with and/or can interface with the one or more application APIs 312 to exchange information (e.g., information obtained or generated by an application API 312, information obtained or generated by the application control model 328) to facilitate controlling operations of the application agent, associated application, and/or the application management component.

The application control framework 300, application agent, and/or application management component can leverage transitions in wireless states associated with the communication network 302 and/or communication devices 304 to facilitate controlling operation of the application to transition the application between application states (e.g., in accordance with an associated mapping function). The application control framework 300 also can leverage existing (e.g., legacy) wireless states mechanisms to facilitate controlling operation of applications (e.g., application state transitions). The application control framework 300 can thereby provide for radio-level control of applications associated with the communication network 302.

In accordance with various implementations, the systems, application control framework, methods, and techniques disclosed herein can be implemented without requiring a change to existing access technology practices. The disclosed subject matter, in part by employing application agents (e.g., 110) and an application management component (e.g., 116), can indirectly consider wireless-state-changes overhead when making transition changes, and/or making determinations regarding transition changes, between application states (e.g., active, doze, etc.) for respective applications (e.g., intelligent or qualified applications) operating in the communication network environment, as more fully described herein. The disclosed subject matter also can enable the applications agents and/or an associated application(s) to at least be indirectly cognizant of the radio or wireless states (e.g., radio resource control (RRC) states) and can map the application states of respective applications to the wireless states associated with applications to facilitate controlling transitions of application states of applications based at least in part on the wireless states. The disclosed subject matter, employing the application agents and application management component, can utilize a non-control channel as a mechanism to present or indicate aggregated network desired behavior in relation to respective applications to facilitate enabling the application agents and application management component to control operations, including application state transitions, of the respective applications.

In some implementations, an application agent(s) (e.g., 110) associated with an application (e.g., 112), and/or the application, can access and/or communicate (e.g., directly) with (e.g., signal with) lower network layers (e.g., media access control MAC) layer, physical (PHY) layer, etc.), and/or can facilitate signaling between applications and the lower network layers, to facilitate controlling operations, including application state transitions, of an application in response to network conditions (e.g., network congestion levels, etc.), as more fully disclosed herein. The application management component (e.g., 116) can at least partially control application operations and behavior by generating and/or using a mapping of multi-dimensional network factors (e.g., network conditions, network policies, network anomalies, etc.) to the multiple application states (e.g., active, doze, etc.) of the applications. Intelligent or qualified applications, which can be certified with the communication network, can facilitate enabling the application management component and other components associated with the communication network to apply cross layer optimization procedures to coordinate preventative measures and desirably (e.g., optimally, acceptably, etc.) manage user experience and network resources, as more fully disclosed herein.

When a flow is mapped to active state, the application agent and/or associated application can determine that the communication network can meet the demands on the network by the application. When a flow is mapped to doze state and/or the application is commanded to be in the doze state, the application can operate, and/or the application can control the application to operate, using desirable (e.g., good) application behavior and can utilize alternative features, such as utilizing a cache, making another access selection, utilizing queue management and local storage, and/or other control means available to the application, to facilitate reducing the application's demand on the communication network. For example, when the application management component sets a network congestion indicator bit to indicate there is a high level of network congestion, the application agent associated with the application can transition the application from active state to doze state, and the application or associated application agent can control application operations to use good application behavior and/or the alternative features to reduce or minimize requests to the communication network and/or packet transmissions over the wireless communication channel.

An application (e.g., 112), such as an intelligent or qualified application, exercising good behavior can apply various operational parameter thresholds and use the alternative measures to stay in the doze state as much and/or as long as possible to reduce or minimize the application's demand on the communication network. Certain applications, depending in part on their category, can generally remain in a doze state and typically can enter (e.g., can only enter) the active state in response to the associated application agent identifying the wireless state associated with the application or associated communication device being in an active state.

In some implementations, the disclosed subject matter, employing the application agents and application management component, can create a virtual fence for respective specific behaviors of applications based at least in part on user policies, network policies, and/or content policies relating to application or communication device location, rate of speed of an application or a communication device associated with a user, direction of travel of an application or a communication device associated with a user, usage models, and/or other factors, in accordance with defined application-control criterion(s). The application agents and application management component of the disclosed subject matter also can establish a closed feedback loop with the applications and can use the closed feedback loop to facilitate performing efficient global state updates to and/or transitions of application states of applications in relation to (e.g., responsive to) radio states associated with applications or communication devices and/or application states of other applications, and can be adaptive to various (e.g., different) environmental conditions relating to the communication network environment and applications associated therewith. This can function in a manner analogous to traffic stop lights that can be adaptive to a variety of different environmental conditions. The disclosed subject matter, using the application agents and application management component, can function, for example, as a preprocessor in front of applications in relation to communication of traffic associated with applications (e.g., a stop-and-go mechanism in relation to communication of traffic associated with applications), as more fully described herein.

The disclosed subject matter can provide for significant flexibility for the communication network to better differentiate between the traffic flows based at least in part on multi-dimensional application-control criteria. For example, the application management component and/or application agents associated with application can utilize analytics relating to the communication networks and applications to control scheduling of traffic flows of applications to enforce relative fairness among application traffic flows, which can enhance user experiences in relation to the applications, as compared to conventional schemes. The disclosed subject matter, using the application management component and application agents, can provide direct network control over the applications more efficiently during periods of high or undesirable (e.g., unacceptable) network congestion (e.g., network congestion that exceeds a defined high threshold network congestion level) or emergency response situations associated with the communication network. Also, the disclosed subject matter, using the application management component and application agents, can control respective application states of applications in relation to wireless access states and application traffic flows respectively associated with the applications and/or associated communication devices to enable the application states (and associated application traffic flows) and wireless access states to be in direct synchronization, or at least substantially in direct synchronization, with each other to enhance (e.g., maximize, optimize, etc.) the utilization of radio resources by the communication network and associated devices and components.

The disclosed subject matter, in part by employing the application agents, application management component, defined application-control criterion(s), defined certification criterion(s), etc., as described herein, can provide a number of other advantages over conventional systems, methods, and techniques. For instance, the disclosed subject matter can provide improved control over applications to reduce taxing of the communication network by applications, particularly applications that are prone to chattiness (e.g., communicating a significant amount of data or signaling), as compared to conventional systems, methods, or techniques. The disclosed subject matter can automatically lower an application(s)' "total demand" on the communication network and can enforce fairness among respective applications and among respective communication devices, as compared to conventional systems, methods, or techniques.

Also, constant traffic monitoring can undesirably tax communication devices in terms of configuration, enabling, disabling, reporting, etc. The disclosed subject matter can reduce or minimize traffic monitoring (e.g., constant traffic monitoring) at the communication device or the communication network, while also being able to desirably (e.g., at least acceptably) control operations, including transitions between operation states, of applications associated with the communication network. The disclosed subject matter, via its reduction and/or minimization of traffic monitoring and controlling transitioning of applications between multiple application states, can achieve better performance results than conventional systems, methods, or techniques. Further, the disclosed subject matter, by using the application agents and application management component that can automatically control transitions of application states of applications, can provide improved network and application performance by operating preventively to better control or reduce network congestion before the network congestion becomes unduly problematic, as compared to conventional schemes that use a reactive approach to deal with network congestion.

FIG. 4 depicts a block diagram of an example application agent 400 in accordance with various aspects and embodiments of the disclosed subject matter. The application agent 400 can include a communicator component 402 that can be used to communicate (e.g., transmit, receive) information between the application agent 400 and other components (e.g., an application management component, an application(s), etc.). The information can include or relate to, for example, congestion notification indicators from the communication network, detected wireless (e.g., radio) communication conditions associated with a UE associated with the application agent 400 or application being used by the UE, detected radio resources associated with the communication network or UE, an application state of an application, mapping function associated with an application, information relating to a mapping function, information relating to applications (e.g., categorization or characteristics, such as type of application, bandwidth specifications, QoS specifications, or other performance indicators, etc., associated with an application), etc. The application agent 400 can use received information, for example, to facilitate determining what application state an application is to be set to at a given time, determining a current network congestion level or status of the communication network, generating control information to set (e.g., transition, modify) an application state of an application(s), determining a current state of an application(s), generating a mapping function and associated mapping associated with an application, etc.

The application agent 400 also can contain an aggregator component 404 that can aggregate data received (e.g., obtained) from various entities (e.g., application, application management component, communication network, UE, processor, data store, etc.). The aggregator component 404 can correlate respective items of data based at least in part on type of data (e.g., content, network congestion indicator, metadata, etc.), application to which the data relates, source of the data, time or date the data was generated or received, etc., to facilitate analyzing of the data by the analyzer component 406. For example, the aggregator component 404 can aggregate data relating to an application and/or other data (e.g., data relating to the communication network) to facilitate generating a mapping function comprising a mapping between application states and wireless states and/or other factors or parameters.

The application agent 400 can comprise an analyzer component 406 that can analyze data to facilitate determining what application state an application is to be set to at a given time, determining a current network congestion level or status of the communication network, generating control information to set an application state of an application(s), determining a current state of an application(s), generating a mapping function and associated mapping associated with an application, etc., and can generate analysis results, based at least in part on the data analysis. For example, the analyzer component 406 can analyze information relating to network congestion (e.g. network congestion indicator) of the communication network, a current application state of an application, and/or a mapping function associated with the application to determine whether the application is to be transitioned from a current application state to another application state.

The application agent 400 can include a selector component 408 that can select items of data (e.g., data relating to an application, data relating to the communication network, etc.), an applicable algorithm (e.g., a mapping algorithm, a state-transition algorithm, etc.), application-related parameter values, or other information, to facilitate performing one or more functions relating to controlling application states of applications associated with the application agent 400. For example, the selector component 408 can select a mapping function relating to the application, information relating to network congestion level, information indicating a current application state of the application, and/or other information, to facilitate determining an application state to which the application is to be set and/or whether the application state of the application is to be changed.

The application agent 400 also can comprise a state component 410 that can identify available application states of an application, identify a current application state of an application, and facilitate transitioning the application between application states. The application agent 400 can include a notification component 412 that can obtain (e.g., receive, detect, etc.) information relating to network congestion of the communication network and can identify a network congestion level or status based at least in part on such information.

The application agent 400 can contain an update component 414 that can receive updates relating to rules (e.g., application-control rules), mapping functions of applications, communication network conditions, UE communication conditions, etc. The update component 414 can facilitate updating information (e.g., rules, mapping functions, etc.), such as information stored in a data store 428, based at least in part on the received updates.

The application agent 400 can comprise an application controller component 416 that can control and/or schedule transitions between application states, or maintain an application state, for an application based at least in part on a mapping function (and associated application-control rules) associated with the application and information relating to network conditions (e.g., network congestion level or status). The application controller component 416 can operate in conjunction with the analyzer component 406 and/or other components of the application agent 400 (e.g., mapper component 418, resource probe component 420, SDK/API component 422, processor component 426, etc.) to facilitate determining an application state to which an application is to be set at a given time.

The application agent 400 can include a mapper component 418 that can generate or receive a mapping function that can be used in relation to an application to facilitate controlling switching of the application between available application states. In some implementations, the mapper component 418 can obtain information relating to available applications states of an application, performance indicators associated with the application, categorization or characteristics associated with the application, wireless states of the communication network, network policies, and/or user policies, etc., and can generate a mapping function associated with the application based at least in part on such information.

The application agent 400 also can contain a resource probe component 420 that can comprise one or more probes (e.g., radio resource probes) or sensors that can sense or detect communication conditions (e.g., network congestion level, traffic flow rates, etc.) relating to the communication network, a UE and/or a server associated with an application, etc. For example, the resource probe component 420 can use the one or more probes or sensors to detect or obtain information, which can relate to communication conditions associated with the communication network, and can be contained in lower network layers associated with traffic in the communication network. The application agent 400 can use such information relating to communication conditions associated with the communication network to facilitate making a determination regarding an application state an associated application(s) is to be set to (e.g., transitioned to) at a given time, based at least in part on the mapping function(s) associated with the application(s).

The application agent 400 can include an SDK/API component 422 that can use one or more SDKs or APIs that can facilitate enabling the application agent 400 to obtain information relating to communication network conditions, identify information in the lower layers of the traffic flow, etc. The application agent 400 can utilize the one or more SDKs or APIs in a manner that comports with the specifications set by the application management component and/or communication network to facilitate desired control of application states of applications by the application agent 400 and/or to enable the applications to be certified (e.g., self-certified) by the application management component and/or communication network.

The application agent 400 also can contain a certification component 424 that can facilitate certifying or registering a qualified application (e.g., as an intelligent or qualified application) with the application management component and/or communication network. An application can be a qualified application, for example, if the application is able to transition between different application states (e.g., active state, doze state, etc.), is configured to (or is associated with an application agent 400 configured to) comport with network specifications regarding application state transitions in relation to wireless state transitions, is configured to (or is associated with an application agent 400 configured to) use SDKs and/or APIs specified by the application management component and/or communication network, and/or other qualifications as specified by the application management component and/or communication network.

The application agent 400 can comprise a processor component 426 that can work in conjunction with the other components (e.g., communicator component 402, aggregator component 404, analyzer component 406, etc.) to facilitate performing the various functions of the application agent 400. The processor component 426 can employ one or more processors, microprocessors, or controllers that can process data, such as information relating to applications, communication network conditions, UE communication conditions, and/or other information, etc., to facilitate operation of the application agent 400, as more fully disclosed herein, and control data flow between the application agent 400 and other components (e.g., communication network, base station, a server or other communication device, a cloud, etc.) associated with the application agent 400.

The application agent 400 also can include a data store 428 that can store data structures (e.g., user data, metadata), code structure(s) (e.g., modules, objects, hashes, classes, procedures) or instructions, information relating to applications, mapping functions, SDKs, APIs, communication network conditions, defined application-control criteria (and corresponding defined application-control rules), etc., to facilitate controlling operations associated with the application agent 400. In an aspect, the processor component 426 can be functionally coupled (e.g., through a memory bus) to the data store 428 in order to store and retrieve information desired to operate and/or confer functionality, at least in part, to communicator component 402, aggregator component 404, analyzer component 406, etc., and/or substantially any other operational aspects of the application agent 400.

Figure 5:
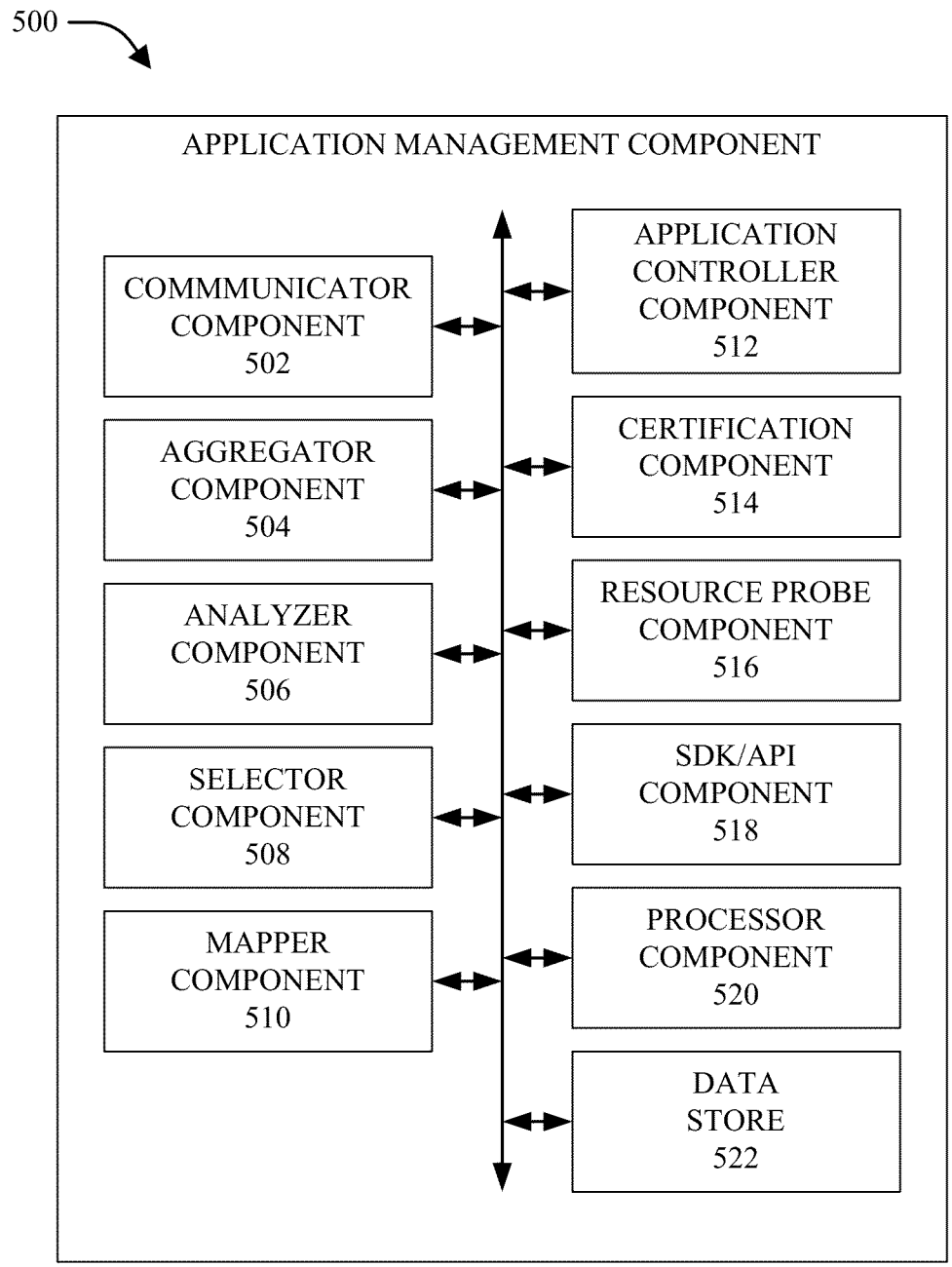
FIG. 5 presents a block diagram of an example application management component in accordance with various aspects and embodiments of the disclosed subject matter.

FIG. 5 presents a block diagram of an example application management component 500 in accordance with various aspects and embodiments of the disclosed subject matter. The application management component 500 can include a communicator component 502 that can be used to communicate (e.g., transmit, receive) information between the application management component 500 and other components (e.g., an application agent, an application(s), a UE or other communication device, a cloud, etc.). The information can include or relate to, for example, congestion notification indicators relating to network congestion associated with the communication network, a mapping function associated with an application (e.g., when the application management component 500 generates the mapping function and transmits it to the application agent associated with the application), information relating to a mapping function, information relating to applications (e.g., categorization or characteristics, such as type of application, available application states, bandwidth specifications, QoS specifications, or other performance indicators, etc., associated with an application), etc. The application management component 500 can use such information or a portion thereof, for example, to facilitate determining a current network congestion level or status of the communication network, generating control or notification information to communicate to an application agent, and/or generating a mapping function and associated mapping associated with an application, etc.

The application management component 500 also can contain an aggregator component 504 that can aggregate data received (e.g., obtained) from various entities (e.g., application, application agent, communication network, UE, processor, data store, etc.). The aggregator component 504 can correlate respective items of data based at least in part on type of data (e.g., content, metadata, etc.), application to which the data relates, source of the data, time or date the data was generated or received, etc., to facilitate analyzing of the data by an analyzer component 506. For example, the aggregator component 504 can aggregate data relating to the communication network to facilitate identifying a network congestion level and generating a network congestion indicator based at least in part on the identified network congestion level. As another example, the aggregator component 504 can aggregate data relating to an application and/or other data (e.g., data relating to the communication network) to facilitate generating a mapping function comprising a mapping between application states and wireless states and/or other factors or parameters.

The application management component 500 can comprise the analyzer component 506 which can analyze data to facilitate determining a current network congestion level or status of the communication network, generating control information and/or a network congestion indicator to facilitate setting or transitioning an application state of an application(s), and/or generating a mapping function and associated mapping relating to an application, etc., and can generate analysis results, based at least in part on the data analysis. For example, the analyzer component 506 can analyze information relating to network communication conditions to facilitate identifying a network congestion level or state of the communication network.

The application management component 500 can include a selector component 508 that can select items of data (e.g., data relating to the communication network, data relating to an application, etc.), an applicable algorithm (e.g., a mapping algorithm, a state-transition algorithm, etc.), parameter values, or other information, to facilitate performing one or more functions relating to controlling application states of applications associated with the application management component 500. For example, the selector component 508 can select a mapping function relating to the application, information relating to network congestion level, information indicating a current application state of the application, and/or other information, to facilitate determining an application state to which the application is to be set and/or whether the application state of the application is to be changed.

In some implementations, the application management component 500 can include a mapper component 510 that can generate or receive a mapping function that can be used in relation to an application to facilitate controlling switching of the application between available application states. In some implementations, the mapper component 510 can obtain information relating to available applications states of an application, performance indicators associated with the application, categorization or characteristics associated with the application, wireless states of the communication network, network policies, and/or user policies, etc., and can generate a mapping function associated with the application based at least in part on such information. In accordance with various embodiments, the application management component 500 and/or the application agent can generate a mapping function for an application. When the application management component 500 generates a mapping function, the communicator component 502 can communicate the mapping function to the application agent associated with the application.

The application management component 500 can comprise an application controller component 512 that can facilitate controlling and/or scheduling transitions between application states, or maintain an application state, for an application based at least in part on information relating to network conditions (e.g., network congestion level or status). The application controller component 512 can identify or determine, or can receive information indicating, a network congestion level or status of the communication network, and can generate a network congestion indicator and/or other control information, based at least in part on the network congestion level or status. The communicator component 502 can transmit the network congestion indicator and/or other control information to the application agent(s) associated with the application(s) to facilitate controlling the application state(s) of the application(s).

The application management component 500 can contain a certification component 514 that can certify and/or register an application as a qualified application, for example, when such application meets one or more applicable criterion (e.g., defined certification criterion(s) and/or defined application-control criterion(s)) for qualifying the application to be certified (e.g., as an intelligent application). An application can be a qualified application, for example, if the application is able to transition between different application states (e.g., active state, doze state, etc.), is configured to (or is associated with an application agent configured to) comport with network specifications regarding application state transitions in relation to wireless state transitions, is configured to (or is associated with an application agent configured to) use SDKs and/or APIs specified by the application management component 500 and/or communication network, and/or other qualifications as specified by the application management component 500 and/or communication network.

In some implementations, the application management component 500 can include a resource probe component 516 that can provide one or more resource probes, such as radio resource probes, or sensors to an application agent or application. An application agent associated with an application can use the one or more resource probes or sensors to monitor communication conditions associated with the communication network, a UE or server associated with an application, etc., as more fully disclosed herein.

In certain implementations, the application management component 500 can contain an SDK/API component 518 that can provide one or more SDKs or APIs to an application agent or application in relation to managing transitioning applications between application states. The one or more SDKs or APIs can facilitate enabling the application agent to obtain information relating to communication network conditions, identify information in the lower layers of the traffic flow, coordinating or controlling operation of the application in accordance with communication network standards relating to qualified (e.g., intelligent) applications (e.g., communication network policies applicable to an application certified as a qualified application), etc., as described herein. In some implementations, the SDK/API component 518 also can make APIs and/or SDKs available to application developers to enable application developers to be aware of the underlined network states.

In another aspect, the application management component 500 can comprise a processor component 520 that can work in conjunction with the other components (e.g., communicator component 502, aggregator component 504, analyzer component 506, etc.) to facilitate performing the various functions of the application management component 500. The processor component 520 can employ one or more processors, microprocessors, or controllers that can process data, such as information relating to applications, the communication network, and/or other information, etc., to facilitate operation of the application management component 500, as more fully disclosed herein, and control data flow between the application management component 500 and other components (e.g., application agent, application, communication network, base station, server, UE, etc.) associated with the application management component 500.

The application management component 500 also can include a data store 522 that can store data structures (e.g., user data, metadata), code structure(s) (e.g., modules, objects, hashes, classes, procedures) or instructions, information relating to applications, the communication network, defined application-control criteria (and corresponding defined application-control rules), defined certification criteria, SDKs, APIs, etc., to facilitate controlling operations associated with the application management component 500 and/or controlling application states or operation of applications associated with the communication network. The processor component 520 can be functionally coupled (e.g., through a memory bus) to the data store 522 in order to store and retrieve information desired to operate and/or confer functionality, at least in part, to the communicator component 502, aggregator component 504, analyzer component 506, etc., and/or substantially any other operational aspects of the application management component 500.

Figure 6:
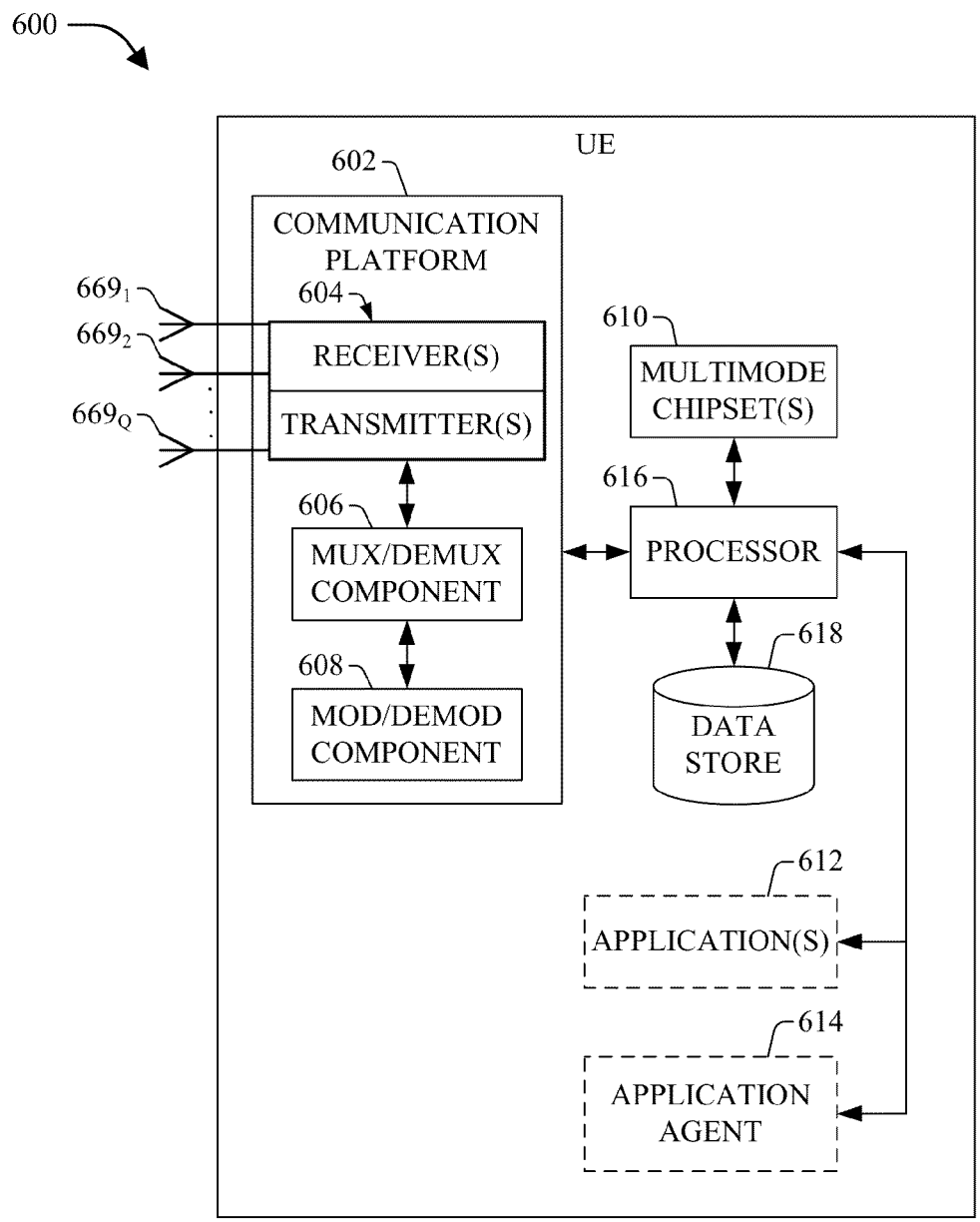
FIG. 6 depicts a block diagram of an example UE in accordance with an aspect of the disclosed subject matter.

FIG. 6 depicts a block diagram of an example UE 600 in accordance with an aspect of the disclosed subject matter. In an aspect, the UE 600 can be a multimode access terminal, wherein a set of antennas $669_1$-$669_Q$ (Q is a positive integer) can receive and transmit signal(s) from and to wireless devices like access points, access terminals, wireless ports and routers, and so forth, that operate in a radio access network. It should be appreciated that antennas $669_1$-$669_Q$ can be part of the communication platform 602, which can comprise electronic components and associated circuitry that can provide for processing and manipulation of received signal(s) and signal(s) to be transmitted, e.g., by receivers and transmitters 604, multiplexer/demultiplexer (mux/demux) component 606, and modulation/demodulation (mod/demod) component 608.

In another aspect, the UE 600 can include a multimode operation chipset(s) 610 that can allow the UE 600 to operate in multiple communication modes in accordance with disparate technical specification for wireless technologies. In an aspect, multimode operation chipset(s) 610 can utilize communication platform 602 in accordance with a specific mode of operation (e.g., voice, GPS). In another aspect, multimode operation chipset(s) 610 can be scheduled to operate concurrently (e.g., when Q>1) in various modes or within a multi-task paradigm.

In some implementations, the UE 600 can comprise (e.g., optionally) one or more applications 612 that can include or provide respective application functions based at least in part on the type of application. In accordance with various implementations, all or a portion of an application or that application's functionality can reside on the UE 600 and/or all or a portion of that application or its functionality can reside on another device (e.g., another communication device, a communication device located in or associated with a cloud, etc.) associated with the communication network.

In certain implementations, the UE 600 can contain (e.g., optionally) an application agent 614 that can perform various functions and operations to facilitate controlling switching of application states based at least in part on a mapping function associated with an application and information relating to communication conditions associated with the communication network and/or UE associated with the application, as more fully disclosed herein. In accordance with various implementations, an application agent can reside on the UE 600 and/or in another location (e.g., in the cloud, in the communication network, in a base station, etc.), based at least in part on the type of application, type of UE, number of potential concurrent users of an application, etc.

In still another aspect, the UE 600 also can include a processor(s) 616 that can be configured to confer functionality, at least in part, to substantially any electronic component within the UE 600, in accordance with aspects of the disclosed subject matter. For example, the processor(s) 616 can facilitate enabling the UE 600 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 616 can facilitate enabling the UE 600 to process data relating to messaging, voice calls, or other services (e.g., Internet services or access, services related to applications, etc.).

The UE 600 also can contain a data store 618 that can store data structures (e.g., user data, metadata); code structure(s) (e.g., modules, objects, classes, procedures) or instructions; message hashes; information relating to applications or application agents, the communication network, or other aspects associated with the UE 600; user policies; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 616 can be functionally coupled (e.g., through a memory bus) to the data store 618 in order to store and retrieve information (e.g., mapping functions; application-related information; network-related information (e.g., network congestion indicator or status, information relating to communication conditions of the communication network, etc.); frequency offsets; desired algorithms; etc.) desired to operate and/or confer functionality, at least in part, to communication platform 602, multimode operation chipset(s) 610, application(s) 612, and/or application agent 614, and/or substantially any other operational aspects of the UE 600.

Figure 7:
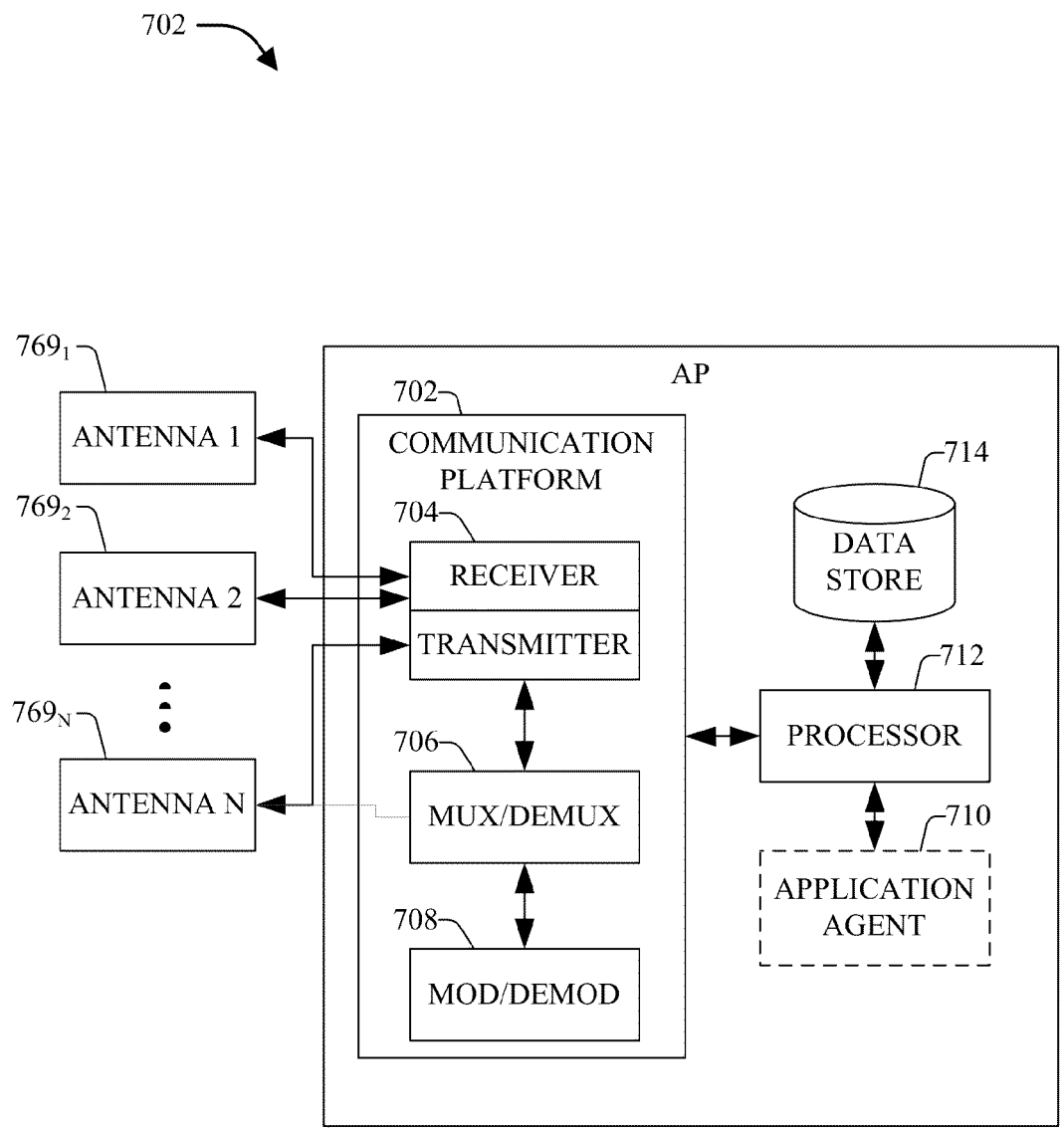
FIG. 7 illustrates a block diagram of an example access point in accordance with an aspect of the disclosed subject matter.

FIG. 7 illustrates a block diagram of an example AP 700 (e.g., femtocell, picocell, macro base station, etc.) in accordance with an aspect of the disclosed subject matter. The AP 700 can receive and transmit signal(s) from and to wireless devices like access points (e.g., femtocells, picocells, base stations, etc.), access terminals (e.g., UEs), wireless ports and routers, and the like, through a set of antennas $769_1$-$769_N$. In an aspect, the antennas $769_1$-$769_N$ are a part of a communication platform 702, which comprises electronic components and associated circuitry that can provide for processing and manipulation of received signal(s) and signal(s) to be transmitted. In an aspect, the communication platform 702 can include a receiver/transmitter 704 that can convert signal from analog to digital upon reception, and from digital to analog upon transmission. In addition, receiver/transmitter 704 can divide a single data stream into multiple, parallel data streams, or perform the reciprocal operation.

In an aspect, coupled to receiver/transmitter 704 can be a multiplexer/demultiplexer (mux/demux) 706 that can facilitate manipulation of signal in time and frequency space. The mux/demux 706 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 706 can scramble and spread information (e.g., codes) according to substantially any code known in the art, e.g., Hadamard-Walsh codes, Baker codes, Kasami codes, polyphase codes, and so on. A modulator/demodulator (mod/demod) 708 also can be part of the communication platform 702, and can modulate information according to multiple modulation techniques, such as frequency modulation, amplitude modulation (e.g., M-ary quadrature amplitude modulation (QAM), with M a positive integer), phase-shift keying (PSK), and the like.

In some implementations, the AP 700 can include (e.g., optionally) an application agent 710 that can perform various functions and operations to facilitate controlling switching of application states based at least in part on a mapping function associated with an application and information relating to communication conditions associated with the communication network and/or UE associated with the application, as more fully disclosed herein. In accordance with various implementations, an application agent can reside on the AP 700 and/or in another location (e.g., in the cloud, in the communication network, in a UE, etc.), based at least in part on the type of application, type of AP, type of UE, number of potential concurrent users of an application, etc.

The AP 700 also can comprise a processor(s) 712 that can be configured to confer and/or facilitate providing functionality, at least partially, to substantially any electronic component in or associated with the AP 700. For instance, the processor(s) 712 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 712 also can facilitate performing other operations and/or functions on data, such as, for example, performing various operations and/or functions to facilitate controlling switching of application states based at least in part on a mapping function associated with an application and information relating to communication conditions associated with the communication network and/or UE associated with the application.

In another aspect, the AP 700 can include a data store 714 that can store data structures; code instructions; rate coding information; information relating to measurement of radio link quality or reception of information related thereto; information relating to establishing a communications connection between a communication device (e.g., UE) and other communication devices; system or device information like policies and specifications; code sequences for scrambling; spreading and pilot transmission; floor plan configuration; access point deployment and frequency plans; scheduling policies; and so on. The processor(s) 712 can be coupled to the data store 714 in order to store and retrieve information (e.g., a desired algorithm (e.g., mapping algorithm), mapping function associated with an application, information relating to multiplexing/demultiplexing or modulation/demodulation, information relating to radio link levels, information relating to establishing communication connections associated with a UE(s) served by the AP 700, etc.) desired to operate and/or confer functionality to the communication platform 702, and/or other operational components of AP 700.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 8-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 8:
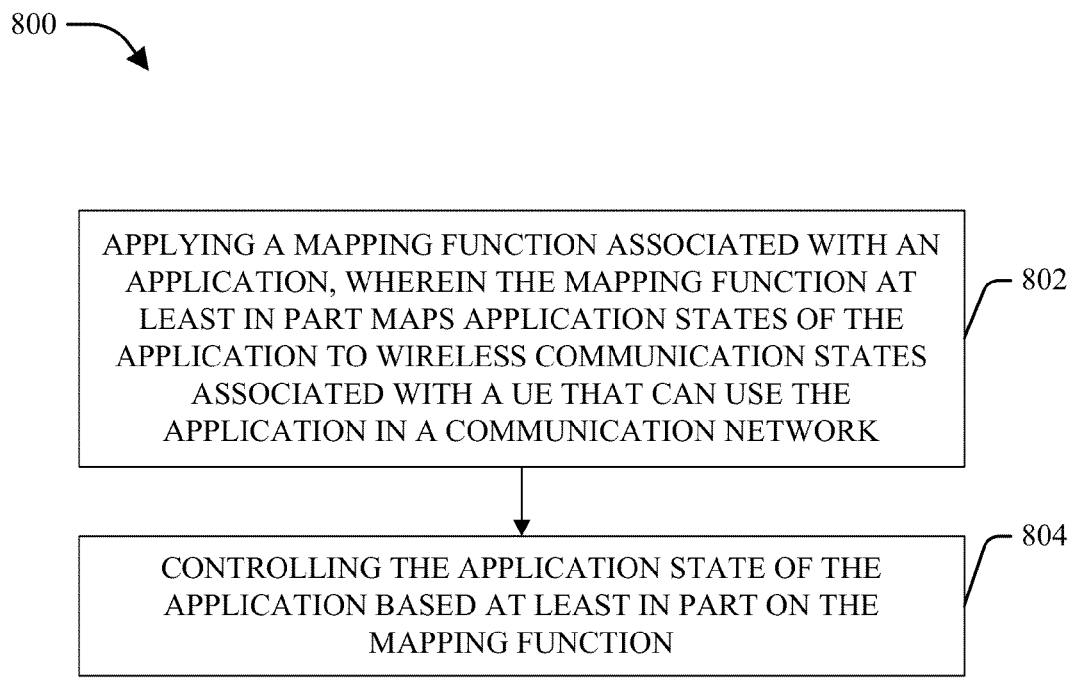
FIG. 8 illustrates a flow diagram of an example method for controlling application states of an application in accordance with various aspects and embodiments.

FIG. 8 illustrates a flow chart of an example method 800 for controlling application states of an application in accordance with various aspects and embodiments. In accordance with various aspects, the method 800 can be utilized by, for example, an application agent and/or an application management component.

At 802, a mapping function associated with an application can be applied, wherein the mapping function at least in part maps application states of the application to wireless (e.g., radio) communication states associated with a UE that can use the application in a communication network. The application or application management component can generate the mapping function associated with the application. The mapping function also can include a mapping of other factors, parameters, and/or performance indicators (e.g., KPIs) in relation to the mapping of the application states to the wireless communication states. The application agent can apply the mapping function to facilitate controlling transitioning of the application between application states based at least in part the wireless communication state associated with the UE at a given time.

At 804, the application state of the application can be controlled based at least in part on the mapping function. The application agent and/or application management component can control the application state of the application based at least in part on the mapping function associated with the application.

For instance, at certain times, the network congestion level can reach a defined high threshold network congestion level, which can be a network condition wherein it can be desirable to have qualified (e.g., intelligent) applications transition to a doze state (e.g., when possible (e.g., when in accordance with an application's mapping function)). During those certain times, the application management component can generate a network congestion indicator, which can indicate that the network congestion level is at or above the defined high threshold network congestion level and, when in accordance with respective mapping functions, qualified applications associated with the communication network are to be switched to the doze state. The application agent(s) can receive the network congestion indicator, and applying the respective mapping functions associated with the respective qualified applications, the application agent(s) can transition at least some of the qualified applications to the doze state, when in accordance with their respective mapping functions.

As another example, multiple applications can be operating at the same time, wherein a first application is in an active state and a second application is in a doze state. The wireless communication state associated with the multiple applications can be in an active or communication-ready state (e.g., FTCH or DCH). The application agent can detect that the wireless communication state is in an active or communication-ready state, and can determine that the second application is to be transitioned from the doze state to the active state based at least in part on the mapping function associated with the second application and the wireless communication state being in an active or communication-ready state. The application agent can generate control information to facilitate switching the second application to the active state. The second application can transition from the doze state to the active state in response to the control information. As a result, the first application and second application can both be in the active state and communicating (e.g., transmitting, receiving) voice or data while the wireless communication state in the active or communication-ready state. This can reduce signaling and switching involved in having the wireless communication channel be in an active or communication-ready state while the first application is in the active state, while the second application is in the doze state, followed by the wireless communication channel switching to the idle state when the first application switches to the doze state, followed by the wireless communication channel switching back into the active or communication-ready state due to the second application switching from the doze state to the active state.

Figure 9:
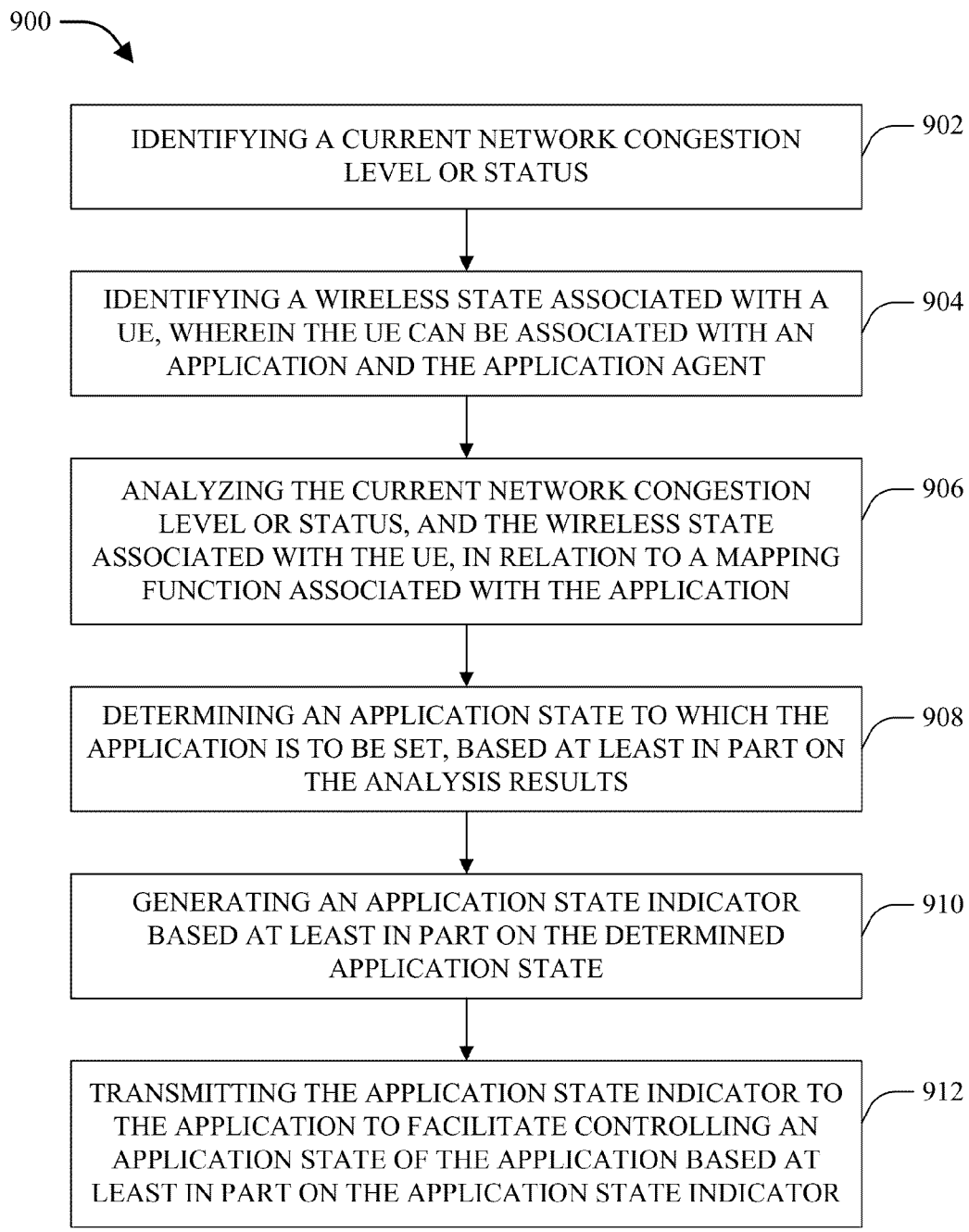
FIG. 9 depicts a flow diagram of another example method for controlling application states of an application in accordance with various aspects and embodiments.

Referring next to FIG. 9, depicted is a flow chart of another example method 900 for controlling an application state of an application in accordance with various aspects and embodiments. In accordance with various aspects, the method 900 can be utilized by an application agent, for example.

At 902, a current network congestion level or status can be identified. The application agent can identify the current network congestion level or status based at least in part on a receive network congestion indicator and/or network-congestion-related information detected by the application agent. At 904, a wireless state associated with a UE can be identified, wherein the UE can be associated with an application and the application agent. The application agent can identify the wireless state (e.g., active or communication-ready state, such as, for example, FTCH or DCH; idle state, etc.) associated with the UE.

At 906, the current network congestion level or status, and the wireless state associated with the UE, can be analyzed in relation to a mapping function associated with the application. The application agent can analyze the current network congestion level or status, and the wireless state associated with the UE, and can apply the mapping function to such information. At 908, a determination can be made regarding an application state to which the application is to be set, based at least in part on the analysis results. The application agent can determine or identify which application state the application is to be set based at least in part on the mapping function, the current network congestion level or status, and the wireless state associated with the UE.

At 910, an application state indicator can be generated based at least in part on the determined application state. The application agent can generate control information, comprising the application state indicator, wherein the application state indicator can be an indicator that is in accordance with the determined application state. For example, a first or active application state indicator can indicate that the application is to be set to the active state, and a second or doze application state indicator can indicate that the application is to be set to the doze state.

At 912, the application state indicator can be transmitted to the application to facilitate controlling an application state of the application based at least in part on the application state indicator. The application agent can transmit the control information, including the application state indicator to the application. The application can switch to a desired application state (or can maintain the desired application state) in accordance with the value (e.g., first or active value; or second or doze value) of the application state indicator.

Figure 10:
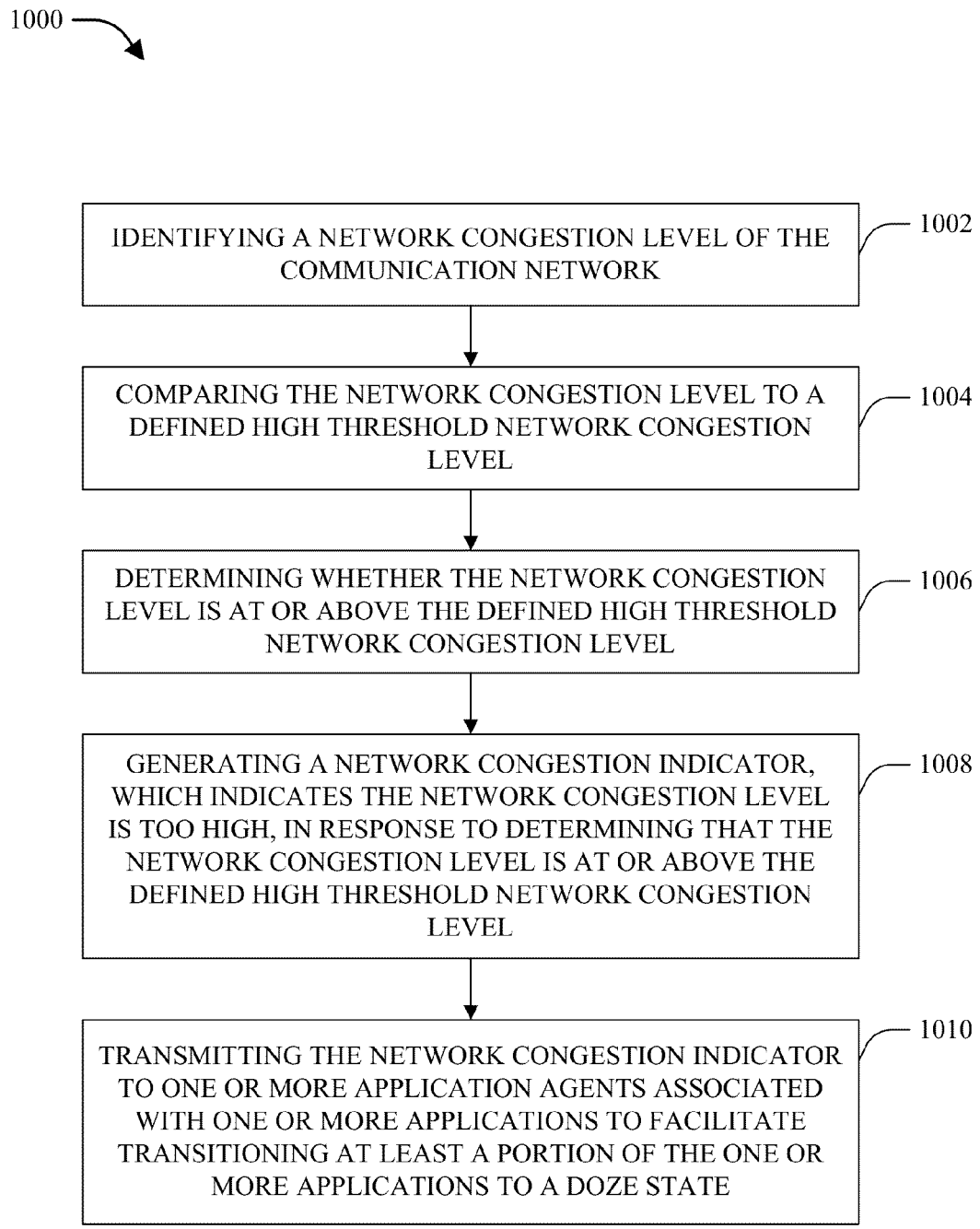
FIG. 10 is a flow diagram of still another example method for controlling application states of an application in accordance with various aspects and embodiments.

Turning to FIG. 10, illustrated is a flow chart of still another example method 1000 for controlling an application state of an application in accordance with various aspects and embodiments. The method 1000 can be employed by an application management component, for example.

At 1002, a network congestion level of the communication network can be identified (e.g., by the application management component). At 1004, the network congestion level can be compared to a defined high (e.g., maximum) threshold network congestion level. The application management component can compare the identified network congestion level to the defined high threshold network congestion level.

At 1006, a determination can be made regarding whether the network congestion level is at or above the defined high threshold network congestion level. The application management component can determine whether the network congestion level is at or above the defined high threshold network congestion level to facilitate determining whether an application state of one or more applications is to be changed.

At 1008, a network congestion indicator, which indicates the network congestion level is too high, can be generated, in response to determining that the network congestion level is at or above the defined high threshold network congestion level. The application management component can generate the network congestion indicator in response to the application management component determining that the network congestion level is at or above the defined high threshold network congestion level. If the application management component determines that the network congestion level is below the defined high threshold network congestion level, the application management component can determine that no network congestion indicator is be generated, or can generate a different network congestion indicator (e.g., indicating the network congestion level is not too high).

At 1010, the network congestion indicator can be transmitted to one or more application agents associated with one or more applications to facilitate transitioning at least a portion of the one or more applications to a doze state. The application management component can transmit the network congestion indicator to one or more application agents, wherein each application agent can be associated with one or more applications. The one or more application agents can receive the network congestion indicator, and can analyze the network congestion indicator and/or other factors or parameters, and can apply a mapping function(s) associated with an application(s) to facilitate determining which applications are to be switched to or maintained in the doze state. It can be desirable to place the application in the doze state based on the network congestion indicator, due to the network congestion level being too high, and typically a significant portion of applications can be set to the doze state, based at least in part on their respective mapping functions and the network congestion indicator. However, for certain applications (e.g., an application with a certain performance indicator(s) that indicates the application has time-critical performance constraints, at least at this time, which makes it desirable to maintain the application in the active state), based at least in part on the mapping function of such an application, an application may still desire to be in an active state, even when the network congestion indicator indicates the network congestion level is too high. In such instance, that application can remain in the active state. As a result, based at least in part on the network congestion indicator and the respective mapping functions of the one or more applications, the one or more application agents can transition at least a portion of the one or more applications to the doze state.

Figure 11:
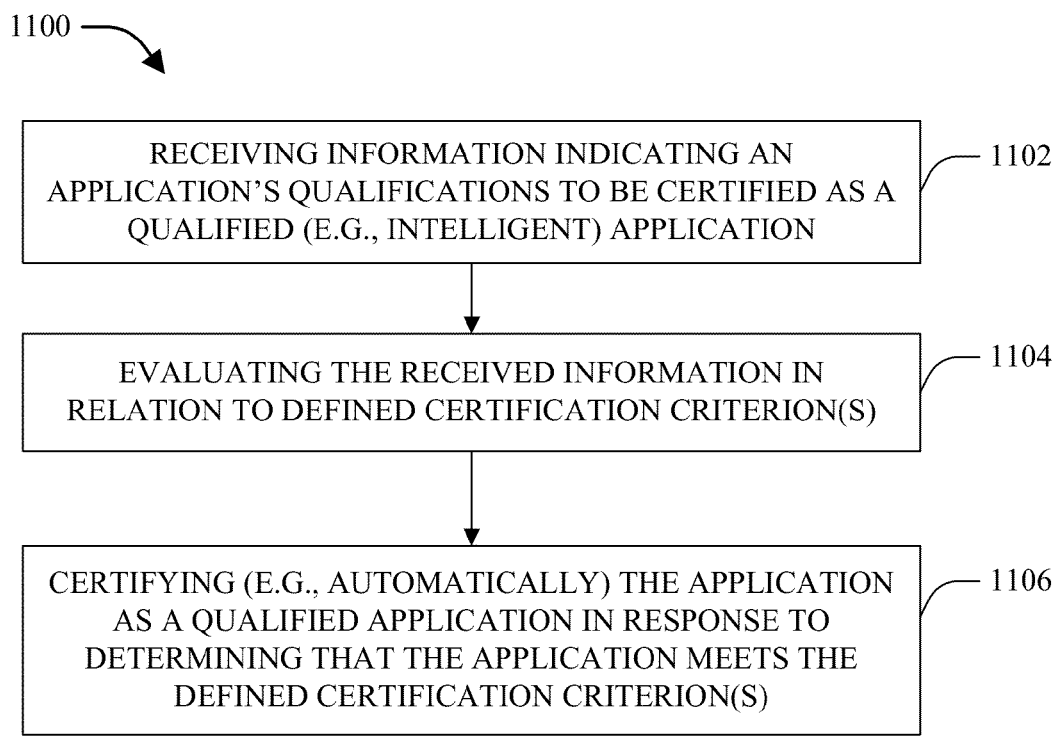
FIG. 11 illustrates a flow diagram of an example method for certifying an application as a qualified (e.g., intelligent) application to facilitate controlling switching of application states of the application in accordance with various aspects and embodiments.

FIG. 11 presents a flow chart of an example method 1100 for certifying an application as a qualified (e.g., intelligent) application to facilitate controlling switching of application states of the application in accordance with various aspects and embodiments. The method 1100 can be employed by an application management component, for example.

At 1102, information indicating an application's qualifications to be certified as a qualified (e.g., intelligent) application can be received. The application management component can receive such information from an application and/or an application agent associated with the application. The information can include, for example, information relating to available application states of the application, information indicating whether the application (and/or the associated application agent) will comply with applicable application-control rules, an SDK(s), and/or an API(s); the application (and/or the associated application agent) will provide information regarding its current application state when desired by the application management component; and/or other information that may be relevant to determining whether the application satisfies the defined certification criterion(s).

At 1104, the received information can be evaluated (e.g., compared) in relation to the defined certification criterion(s). The application management component can evaluate the received information in relation to the defined certification criterion(s) to determine whether the application qualifies to be certified as a qualified application.

At 1106, the application can be certified (e.g., automatically) as a qualified application in response to determining that the application meets the defined certification criterion(s). The application management component can certify the application as a qualified application in response to determining that the application meets the defined certification criterion(s). The application management component and the application agent associated with the application can exchange other information, such as application-control rules, an SDK(s), an API(s), resource probes, etc., which the application agent can use to facilitate controlling switching of application states of the application. In some implementations, the SDK(s) or API(s) can be provided to the application agent, wherein the application agent can use the SDK(s) or API(s) to facilitate certifying the application with the application management component. The application and/or application agent also can provide the application management component with performance indicators (e.g., KPIs) or other information relating to operations, characteristics, and/or categorization of the application. In accordance with various implementations, the application agent and/or application management component can generate a mapping function associated with the application, as more fully disclosed herein.

Figure 12:
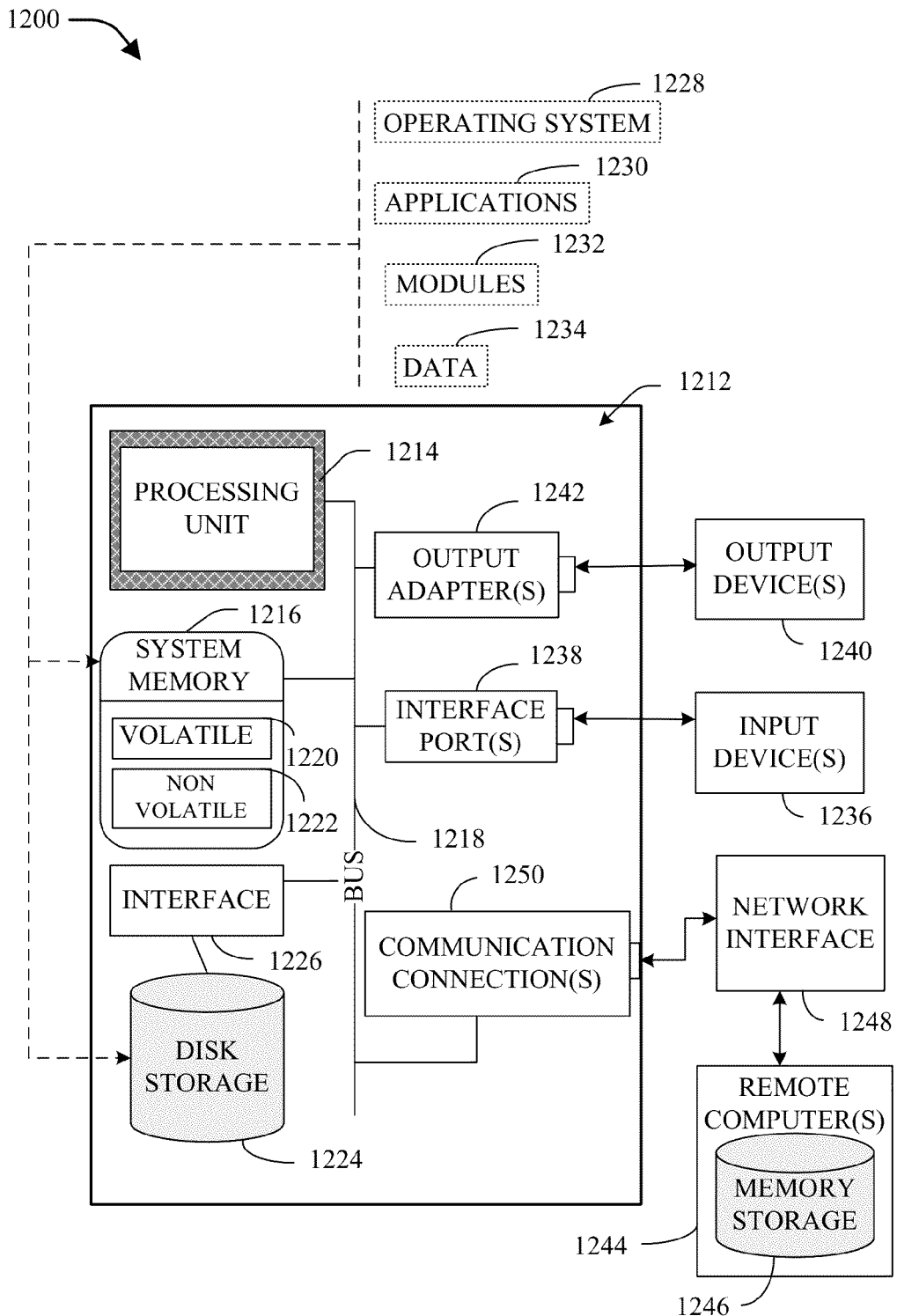
FIG. 12 is a schematic block diagram illustrating a suitable operating environment.
Figure 13:
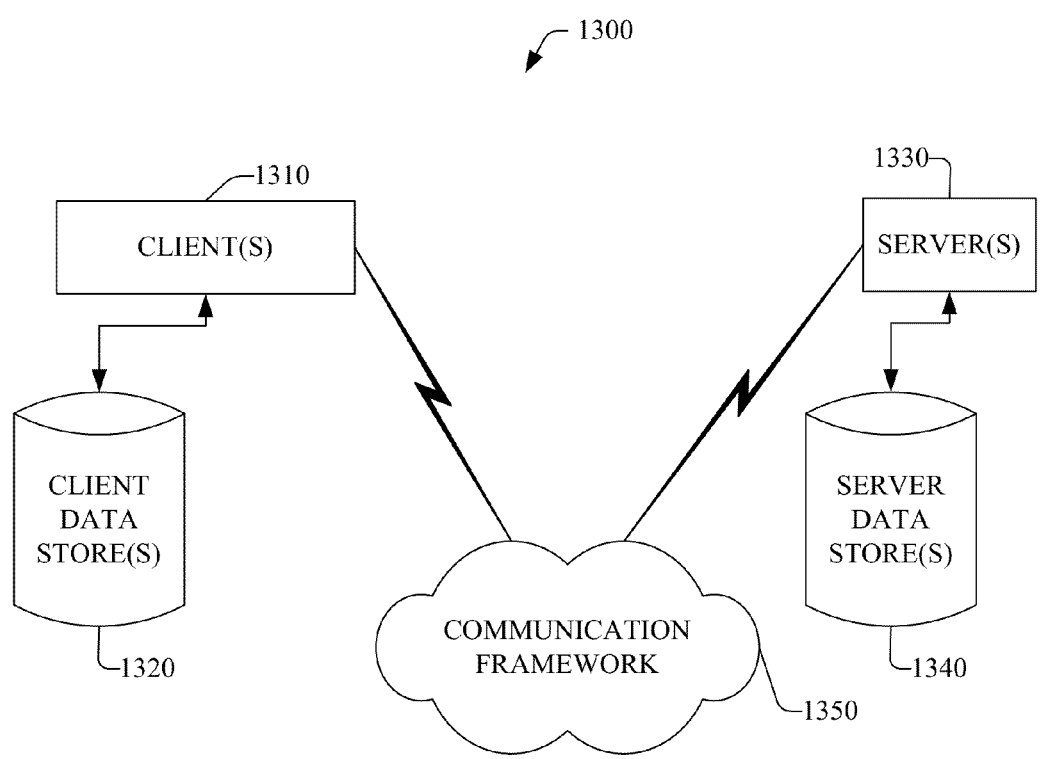
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, electronic tablets or pads, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 12, a suitable environment 1200 for implementing various aspects of this disclosure includes a computer 1212. The computer 1212 includes a processing unit 1214, a system memory 1216, and a system bus 1218. It is to be appreciated that the computer 1212 can be used in connection with implementing one or more of the systems or components shown and described in connection with FIGS. 1-7. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 also includes removable/non-removable, volatile/nonvolatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226.

FIG. 12 also depicts software that acts as an intermediary between users and the basic computer resources described in the suitable operating environment 1200. Such software includes, for example, an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored, e.g., in system memory 1216 or on disk storage 1224. It is to be appreciated that this disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 (e.g., computing system) with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

It is to be noted that aspects, features, and/or advantages of the disclosed subject matter can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as Internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "Node B," "Evolved Node B" (eNode B or eNB), "Home Node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, UE, AP, communication network, application, application agent, application management component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
applying, by a system comprising a processor, a mapping function associated with an application, wherein the mapping function at least in part maps a set of application states of the application to a set of wireless communication states associated with a communication device that uses the application in a communication network, wherein the set of application states comprises a first application state and a second application state; and
in response to receiving a network congestion indicator that indicates a level of network congestion in the communication network, controlling, by the system, transitioning the application from the first application state to the second application state, based on the network congestion indicator, the mapping function, and a wireless communication state associated with the communication device.

2. The method of claim 1, wherein the first application state is an active state and the second application state is an inactive state, and the set of wireless communication states comprises a communication-ready state and an idle state.

3. The method of claim 1, wherein the first application state is an active state and the second application state is an inactive state, and the method further comprises:
receiving, by the system, the network congestion indicator that indicates the level of the network congestion has breached a defined threshold network congestion level of the communication network;
determining, by the system, that the application is to transition from the active state to the inactive state, based on the mapping function, in response to receiving the network congestion indicator; and
transitioning, by the system, the application from the active state to the inactive state in response to the determining.

4. The method of claim 2, further comprising:
in response to identifying the wireless communication state is in the communication-ready state, transitioning, by the system, the application from the inactive state to the active state based on the mapping function.

5. The method of claim 2, further comprising:
receiving, by the system, an instruction to transition the application from the inactive state to the active state to facilitate synchronizing communication of traffic associated with the application via a communication channel in connection with communication of a set of other traffic associated with a set of other applications via the communication channel during a time period that the communication channel is associated with the communication-ready state; and
transitioning, by the system, the application from the inactive state to the active state in response to the receiving the instruction.

6. The method of claim 1, further comprising:
directing, by the system, information relating to the application to an application management component associated with the communication network; and
certifying, by the system, the application as a qualified application with the application management component associated with the communication network based on the information relating to the application.

7. The method of claim 6, wherein the information comprises a set of performance indicators associated with the application, the set of performance indicators comprises category information relating to an application category associated with the application and an elasticity level associated with the application, and the elasticity level relates to an amount of communication delay with the communication network that is tolerable to the application without interruption of service of the application.

8. The method of claim 1, further comprising:
generating, by the system, the mapping function based on the set of application states, the set of wireless communication states, and a set of performance indicators associated with the application.

9. A system, comprising:
a memory to store executable instructions; and
a processor, coupled to the memory, that facilitates execution of the executable instructions to perform operations, comprising:
applying a mapping function associated with an application, wherein the mapping function at least in part maps a set of application states of the application to a set of radio communication states associated with a mobile communication device that uses the application in a communication network, wherein the set of application states comprises a first application state and a second application state; and
in response to receiving a network congestion indicator that indicates a network congestion level in the communication network, controlling a transition of the application between the first application state and the second application state, based on the network congestion indicator, the mapping function, and a radio communication state associated with the mobile communication device.

10. The system of claim 9, wherein the first application state is an active state and the second application state is a doze state, and the set of radio communication states comprises a communication-ready state and an idle state.

11. The system of claim 9, wherein the first application state is an active state and the second application state is a doze state, and wherein the operations further comprise:

receiving the network congestion indicator that indicates a defined threshold network congestion level of the communication network is breached based on the network congestion level;

determining that the application is to transition from the active state to the doze state, based on the mapping function, in response to the network congestion indicator; and transitioning the application from the active state to the doze state in response to a determination that the application is to transition from the active state to the doze state.

12. The system of claim 10, wherein the operations further comprise:

transitioning, based on the mapping function, the application from the doze state to the active state in response to a determination that the radio communication state is in the communication-ready state.

13. The system of claim 10, wherein the operations further comprise:

receiving an instruction to transition the application from the doze state to the active state to facilitate synchronization of communication of traffic associated with the application via a communication channel in relation to communication of a set of other traffic associated with a set of other applications via the communication channel during a time period that the communication channel is associated with the communication-ready state; and transitioning the application from the doze state to the active state in response to receipt of the instruction.

14. The system of claim 9, wherein the operations further comprise:

sending information relating to the application to an application management component associated with the communication network; and certifying the application as an intelligent application with the application management component based on the information relating to the application.

15. The system of claim 14, wherein the information comprises a set of performance indicators associated with the application.

16. The system of claim 15, wherein the set of performance indicators comprises category information relating to an application category associated with the application and an elasticity level associated with the application, the elasticity level relates to an amount of communication delay with the communication network that is tolerable by the application without interruption of service of the application, and the application category is at least one application category of a set of application categories comprising video streaming, audio streaming, multimedia, electronic gaming, and voice over Internet protocol.

17. A system, comprising:

a memory to store executable instructions; and a processor, coupled to the memory, that facilitates execution of the executable instructions to perform operations, comprising:

controlling switching of an application between a first application state and a second application state of a set of application states based on a mapping function associated with the application and a wireless communication state associated with the application in relation to a communication network, wherein the mapping function maps the set of application states associated with the application to a set of wireless communication states associated with the application;

in response to identifying a level of network congestion associated with the communication network, determining that the application is to be switched between the first application state and the second application state based on the level of the network congestion and the mapping function; and transmitting a network congestion indicator to an application agent associated with the application to facilitate switching the application between the first application state and the second application state.

18. The system of claim 17, wherein the operations further comprise:

identifying that the level of the network congestion associated with the communication network has reached a defined threshold network congestion level of the communication network; and generating the network congestion indicator to facilitate switching the application from the first application state to the second application state, wherein the first application state is an active state and the second application state is a doze state.

19. The system of claim 17, wherein the first application state is an active state and the second application state is a doze state, and the operations further comprise:

identifying that a second application is in the active state in relation to a communication channel that is associated with a communication-ready state;

generating an application state transition indicator in response to the identification of the second application being in the active state; and transmitting the application state transition indicator to an application agent associated with the application to facilitate switching of the application from the doze state to the active state to facilitate synchronization of communication of traffic associated with the application via the communication channel in connection with communication of other traffic associated with the second application via the communication channel during a time period that the communication channel is associated with the communication-ready state.

20. The system of claim 17, wherein the operations further comprise:

receiving information relating to the application from an application agent associated with the application, wherein the information comprises a set of performance indicators associated with the application, the set of performance indicators comprises category information relating an application category associated with the application and an elasticity level associated with the application, and the elasticity level relates to an amount of communication delay with the communication network that the application can withstand without interruption of service of the application; and certifying the application as a qualified application with the communication network based on the information relating to the application.

* * * * *